(12) United States Patent
Key et al.

(10) Patent No.: US 6,173,386 B1
(45) Date of Patent: Jan. 9, 2001

(54) PARALLEL PROCESSOR WITH DEBUG CAPABILITY

(75) Inventors: Kenneth Michael Key; Michael L. Wright, both of Raleigh, NC (US); Darren Kerr, Palo Alto, CA (US); William E. Jennings, Cary; Scott Nellenbach, Apex, both of NC (US)

(73) Assignee: Cisco Technology, Inc., San Jose, CA (US)

( * ) Notice: Under 35 U.S.C. 154(b), the term of this patent shall be extended for 0 days.

(21) Appl. No.: 09/213,291

(22) Filed: Dec. 14, 1998

(51) Int. Cl.[7] .............................. G06F 15/16; G06F 11/22
(52) U.S. Cl. ................................................ 712/10; 714/38
(58) Field of Search .......................... 714/48, 38; 712/10, 712/244

(56) References Cited

U.S. PATENT DOCUMENTS

| | | | |
|---|---|---|---|
| 4,590,554 | 5/1986 | Glazer et al. | 364/200 |
| 4,598,400 | 7/1986 | Hillis | 370/60 |
| 4,709,327 | 11/1987 | Hillis et al. | 364/200 |
| 4,773,038 | 9/1988 | Hillis et al. | 364/900 |
| 4,791,641 | 12/1988 | Hillis | 371/38 |
| 4,805,091 | 2/1989 | Thiel et al. | 364/200 |
| 4,809,202 | 2/1989 | Wolfram | 364/578 |
| 4,870,568 | 9/1989 | Kahle et al. | 364/200 |
| 4,922,418 | 5/1990 | Dolecek | 364/200 |
| 4,922,486 | 5/1990 | Lidinsky et al. | 370/60 |
| 4,954,988 | 9/1990 | Robb | 365/189.02 |
| 4,965,717 | 10/1990 | Cutts, Jr. et al. | 364/200 |
| 4,993,028 | 2/1991 | Hillis | 371/39.1 |
| 5,070,446 | 12/1991 | Salem | 395/500 |
| 5,093,801 | 3/1992 | White et al. | 364/726 |
| 5,111,198 | 5/1992 | Kuszmaul | 340/825.52 |
| 5,113,510 | 5/1992 | Hillis | 395/425 |
| 5,117,420 | 5/1992 | Hillis et al. | 370/60 |
| 5,129,077 | 7/1992 | Hillis | 395/500 |
| 5,148,547 | 9/1992 | Kahle et al. | 395/800 |

(List continued on next page.)

OTHER PUBLICATIONS

IEEE 1149.1 Device Architecture (continued) Using the Instruction Register, http://www.asset-interech.com/homepage/bscantutr/arch2.htm#using IR, pp. 1–4, 1998.

The Principle of Boundary-Scan Architecture, http://www.asset-intertech.com/homepage/bscantutr/principl.htm, pp. 1–4, 1998.

IEEE 1149.1 Device Architecture, http://www.asset-interech.com/homepage/bscantutr/arch.htm, pp. 1–3, 1998.

IEEE 1149.1 Device Architecture (continute), http://www.asset-intertech.com/homepage/bscantutr/arch3.htm#TAP, pp. 1–3. 1998.

Digigal Systems Testing and Testable Design, Miron Abramovici, et al, Computer Science Press, pp. 342–409, Copyright 1990.

IEEE 1149.1 Device Architecture, http//www.asset-interech.com/homepage/bscantutr/arch.htm, pp. 1–3, 1998.

IEEE 1149.1 Device Architecture (continued), http://www.asset-intertech.com/homepage/bscantutr/arch3.htm#TAP, pp. 1–3, 1998.

Digital Systems Testing and Testable Design, Miron Abramovici, et al., Computer Science Press, pp. 342–409, Copyright 1990.

*Primary Examiner*—David Y. Eng
(74) *Attorney, Agent, or Firm*—Cesari and McKenna

(57) ABSTRACT

A parallel processor is provided that includes integrated debugging capabilities. The processor includes a pipelined processing engine, having an array of processing element complex stages, and input and output header buffers. A debug system is provided that, when triggered, may put some or all of the processing element complexes into a debug mode of operation. When a complex is in debug mode, examination of internal stages of the component circuits of the complex may occur, in order to facilitate debugging of software and hardware errors that may occur during operation of the processor.

12 Claims, 14 Drawing Sheets

U.S. PATENT DOCUMENTS

| | | | |
|---|---|---|---|
| 5,151,996 | 9/1992 | Hillis | 395/800 |
| 5,157,663 | 10/1992 | Major et al. | 371/9.1 |
| 5,175,865 | 12/1992 | Hillis | 395/800 |
| 5,212,773 | 5/1993 | Hillis | 395/200 |
| 5,222,216 | 6/1993 | Parish et al. | 395/275 |
| 5,222,237 | 6/1993 | Hillis | 395/650 |
| 5,247,613 | 9/1993 | Bromley | 395/200 |
| 5,247,694 | 9/1993 | Dahl | 395/800 |
| 5,255,291 | 10/1993 | Holden et al. | 375/111 |
| 5,261,105 | 11/1993 | Potter et al. | 395/725 |
| 5,265,207 | 11/1993 | Zak | 395/200 |
| 5,274,631 | 12/1993 | Bhardwaj | 370/60 |
| 5,289,156 | 2/1994 | Ganmukhi | 340/146.2 |
| 5,295,258 | 3/1994 | Jewett et al. | 395/575 |
| 5,301,310 | 4/1994 | Isman et al. | 395/575 |
| 5,317,726 | 5/1994 | Horst | 395/575 |
| 5,325,487 | 6/1994 | Au et al. | 395/250 |
| 5,349,680 | 9/1994 | Fukuoka | 395/800 |
| 5,355,492 | 10/1994 | Frankel et al. | 395/700 |
| 5,357,612 | 10/1994 | Alaiwan | 395/200 |
| 5,361,363 | 11/1994 | Wells et al. | 395/800 |
| 5,367,692 | 11/1994 | Elelman | 395/800 |
| 5,388,214 | 2/1995 | Leiserson et al. | 395/200 |
| 5,388,262 | 2/1995 | Hillis | 395/650 |
| 5,390,298 | 2/1995 | Kuszmaul et al. | 395/200 |
| 5,404,296 | 4/1995 | Moorhead | 364/421 |
| 5,404,562 | 4/1995 | Heller et al. | 395/800 |
| 5,410,723 | 4/1995 | Schmidt et al. | 395/800 |
| 5,455,932 | 10/1995 | Major et al. | 395/489 |
| 5,475,856 | 12/1995 | Kogge | 395/800 |
| 5,485,627 | 1/1996 | Hillis | 395/800 |
| 5,530,809 | 6/1996 | Doulas et al. | 395/200.2 |
| 5,535,408 | 7/1996 | Hillis | 395/800 |
| 5,561,669 | 10/1996 | Lenney et al. | 370/60.1 |
| 5,568,380 | 10/1996 | Brodnax et al. | 364/184 |
| 5,613,136 | 3/1997 | Casavant et al. | 395/800 |
| 5,617,538 | 4/1997 | Heller | 395/200.02 |
| 5,621,885 | 4/1997 | Del Vigna, Jr. | 395/182.11 |
| 5,627,965 | 5/1997 | Liddell et al. | 395/185.01 |
| 5,673,423 | 9/1997 | Hillis | 395/553 |
| 5,710,814 | 1/1998 | Klemba et al. | 380/9 |
| 5,742,604 | 4/1998 | Edsall et al. | 370/401 |
| 5,748,936 | 5/1998 | Karp et al. | 395/394 |
| 5,751,955 | 5/1998 | Sonnier et al. | 395/200.19 |
| 5,764,636 | 6/1998 | Edsall | 370/401 |
| 5,781,753 * | 7/1998 | McFarland et al. | 712/218 |
| 5,787,243 | 7/1998 | Stiffler | 395/182.11 |
| 5,787,255 | 7/1998 | Parlan et al. | 395/200.63 |
| 5,812,811 | 9/1998 | Dubey et al. | 395/392 |
| 5,832,291 | 11/1998 | Rosen et al. | 395/800.11 |
| 5,838,915 | 11/1998 | Klausmeier et al. | 395/200.45 |
| 5,860,086 * | 1/1999 | Crump et al. | 711/109 |
| 5,872,963 | 2/1999 | Bitar et al. | 395/580 |
| 5,960,211 | 9/1999 | Schwartz et al. | 395/800.22 |
| 6,035,422 * | 3/2000 | Hohl et al. | 714/35 |

\* cited by examiner

PARALLEL PROCESSOR WITH DEBUG CAPABILITY

CROSS-REFERENCE TO RELATED APPLICATIONS

The subject application is related to the following copending applications:

U.S. patent application Ser. No. 09/106,478, filed Jun. 29, 1998, entitled, "PROGRAMMABLE ARRAYED PROCESSING ENGINE ARCHITECTURE FOR A NETWORK SWITCH";

U.S. patent application Ser. No. 09/106,436, filed Jun. 29, 1998, entitled, "ARCHITECTURE FOR A PROCESSOR COMPLEX OF AN ARRAYED PIPELINED PROCESSING ENGINE";

U.S. patent application Ser. No. 09/106,244, filed Jun. 29, 1998, entitled, "SYSTEM FOR CONTEXT SWITCHING BETWEEN PROCESSING ELEMENTS IN A PIPELINE OF PROCESSING ELEMENTS";

U.S. patent application Ser. No. 09/106,246, filed Jun. 29, 1998, entitled, "SYNCHRONIZATION AND CONTROL SYSTEM FOR AN ARRAYED PROCESSING ENGINE";

U.S. patent application entitled "TESTING OF REPLICATED COMPONENTS OF ELECTRONIC DEVICE," filed concurrently with the subject application, Ser. No. 09/212,314. Each of said copending applications is assigned to the Assignee of the subject application, and is incorporated herein by reference in its entirety the subject application is also related to copending U.S. patent application Ser. No. 09/216,519, filed Dec. 18, 1998, entitled, "TIGHTLY COUPLED SOFTWARE PROTOCOL DECODE WITH HARDWARE DATA ENCRIPTION.".

BACKGROUND OF THE INVENTION

1. Field of the Invention

The present invention relates generally to a parallel processor, and more specifically, to a parallel processor comprising an array of processing engine complexes and having integrated debug capabilities. Although the present invention will be described in connection with use in a computer network switch, it will be appreciated by those skilled in the art that other utilities are also contemplated for the present invention, including use in other computer network and processing applications.

2. Brief Description of Related Prior Art

Computer architecture generally defines the functional operation, including the flow of information and control, among individual hardware units of a computer. One such hardware unit is the processor or "processing engine" which contains arithmetic and logic processing circuits organized as a set of data paths. In some implementations, the data path circuits may be configured as a central processing unit (CPU) having operations which are defined by a set of instructions. The instructions are typically stored in an instruction memory and specify a set of hardware functions that are available on the CPU.

A high-performance computer may be realized by using a number of identical CPUs or processors to perform certain tasks in parallel. For a purely parallel multiprocessor architecture, each processor may have shared or private access to non-transient data, such as program instructions (e.g., algorithms) stored in a memory coupled to the processor. Access to an external memory is generally inefficient because the execution capability of each processor is substantially faster than its external interface capability; as a result, the processor often idles while waiting for the accessed data. Moreover, scheduling of external accesses to a shared memory is cumbersome because the processors may be executing different portions of the program. On the other hand, providing each processor with private access to the entire program results in inefficient use of its internal instruction memory.

In an alternative implementation, the data paths may be configured as a pipeline having a plurality of processor stages. This configuration conserves internal memory space since each processor executes only a small portion of the program algorithm. A drawback, however, is the difficulty in apportioning the algorithm into many different stages of equivalent duration. Another drawback of the typical pipeline is the overhead incurred in transferring transient "context" data from one processor to the next in a high-bandwidth application.

One example of such a high-bandwidth application involves the area of data communications and, in particular, the use of a parallel, multiprocessor architecture as the processing engine for an intermediate network station. The intermediate station interconnects communication links and subnetworks of a computer network to enable the exchange of data between two or more software entities executing on hardware platforms, such as end stations. The stations typically communicate by exchanging discrete packets or frames of data according to predefined protocols, such as the Transmission Control Protocol/Internet Protocol (TCP/IP), the Internet Packet Exchange (IPX) protocol, the AppleTalk protocol or the DECNet protocol. In this context, a protocol consists of a set of rules defining how the stations interact with each other.

A router is an intermediate station that implements network services such as route processing, path determination and path switching functions. The route processing function determines the type of routing needed for a packet, whereas the path switching function allows a router to accept a frame on one interface and forward it on a second interface. The path determination, or forwarding decision, function selects the most appropriate interface for forwarding the frame. A switch is also an intermediate station that provides the basic functions of a bridge including filtering of data traffic by medium access control (MAC) address, "learning" of a MAC address based upon a source MAC address of a frame and forwarding of the frame based upon a destination MAC address. Modern switches further provide the path switching and forwarding decision capabilities of a router. Each station includes high-speed media interfaces for a wide range of communication links and subnetworks.

The hardware and software components of these stations generally comprise a communications network and their interconnections are defined by an underlying architecture. Modern communications network architectures are typically organized as a series of hardware and software levels or "layers" within each station. These layers interact to format data for transfer between, e.g., a source station and a destination station communicating over the internetwork. Predetermined services are performed on the data as it passes through each layer and the layers communicate with each other by means of the predefined protocols. Examples of communications architectures include the IPX communications architecture and, as described below, the Internet communications architecture.

The Internet architecture is represented by four layers which are termed, in ascending interfacing order, the network interface, internetwork, transport and application layers. These layers are arranged to form a protocol stack in each communicating station of the network. The lower layers of the stack provide internetworking services and the upper layers collectively provide common network application services. For example, the network interface layer comprises physical and data link sublayers that define a flexible network architecture oriented to the implementation of local area networks (LANs). Specifically, the physical layer is concerned with the actual transmission of signals across the communication medium and defines the types of cabling, plugs and connectors used in connection with the medium. The data link layer ("layer 2") is responsible for transmission of data from one station to another and may be further divided into two sublayers: logical link control (LLC) and MAC sublayers.

The MAC sublayer is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link MAC address. This MAC address is unique for each station interfacing to a LAN. The LLC sublayer manages communications between devices over a single link of the internetwork.

The primary network layer protocol of the Internet architecture is the Internet protocol (IP) contained within the internetwork layer ("layer 3"). IP is a network protocol that provides internetwork routing and relies on transport protocols for end-to-end reliability. An example of such a transport protocol is the Transmission Control Protocol (TCP) contained within the transport layer. The term TCP/IP is commonly used to refer to the Internet architecture. Protocol stacks and the TCP/IP reference model are well-known and are, for example, described in Computer Networks by Andrew S. Tanenbaum, printed by Prentice Hall PTR, Upper Saddle River, N.J., 1996.

Data transmission over the network therefore consists of generating data in, e.g., a sending process executing on the source station, passing that data to the application layer and down through the layers of the protocol stack where the data are sequentially formatted as a frame for delivery over the medium as bits. Those frame bits are then transmitted over the medium to a protocol stack of the destination station where they are passed up that stack to a receiving process. Although actual data transmission occurs vertically through the stacks, each layer is programmed as though such transmission were horizontal. That is, each layer in the source station is programmed to transmit data to its corresponding layer in the destination station. To achieve this effect, each layer of the protocol stack in the source station typically adds information (in the form of a header) to the data generated by the sending process as the data descends the stack.

For example, the internetwork layer encapsulates data presented to it by the transport layer within a packet having a network layer header. The network layer header contains, among other information, source and destination network addresses needed to complete the data transfer. The data link layer, in turn, encapsulates the packet in a frame, such as a conventional Ethernet frame, that includes a data link layer header containing information, such as MAC addresses, required to complete the data link functions. At the destination station, these encapsulated headers are stripped off one-by-one as the frame propagates up the layers of the stack until it arrives at the receiving process.

Increases in the frame/packet transfer speed of an intermediate station are typically achieved through hardware enhancements for implementing well-defined algorithms, such as bridging, switching and routing algorithms associated with the predefined protocols. Hardware implementation of such an algorithm is typically faster than software because operations can execute in parallel more efficiently. In contrast, software implementation of the algorithm on a general-purpose processor generally performs the tasks sequentially because there is only one execution path. Parallel processing of conventional data communications algorithms is not easily implemented with such a processor, so hardware processing engines are typically developed and implemented in application specific integrated circuits (ASIC) to perform various tasks of an operation at the same time. These ASIC solutions, which are generally registers and combinational logic configured as sequential logic circuits or state machines, distinguish themselves by speed and the. However, the development process for such an engine is time consuming and expensive and, if the requirements change, inefficient since a typical solution to a changing requirement is to develop a new ASIC.

Another approach to realizing a high-performance, high-bandwidth network processing engine involves the use of specialized switching hardware to perform a subset of the network functions with the remaining functions executed in software. Examples of such hybrid processing engines are those included in the 7000 and 7500 family of routers manufactured by Cisco Systems, Inc. of San Jose, Calif. The 7000 processing engine comprises a hierarchy of three processors: an interface processor (IP) which handles maintenance of interfaces to external media, a switching processor (SP) that performs switching functions for the router and a routing processor (RP) that is responsible for administration of routing databases. The RP is typically a general-purpose processor that executes a real-time operating system in tandem with the SP, which is a programmable hardware engine optimized for high-performance operations. Instead of using two processors to split tasks directed to information in shared memory, the 7500 series of routers combines the RP and SP into a single general-purpose routing switch processor.

The single, general-purpose processor is generally not fast enough to perform layer 2 or 3 switching operations of frames/packets at line rates (e.g., OC12, OC48 or OC192) of the station's high-speed media interfaces. This is primarily because the bandwidth of the Internet is growing exponentially and significantly faster than the performance capabilities of currently-available data communications equipment. Use of a separate processor for each interface introduces data coherency issues with respect to, e.g., offloading routing tables to each of the interfaces. Solutions to these coherency issues, including updates to the tables, are time consuming and expensive.

A further problem has been debugging of parallel processing engine hardware and software. That is, given the relatively high level of complexity of typical parallel processing engine hardware and software, it has often been quite difficult to analyze the specific internal states of various logic circuits (e.g., the processing elements) of the engine to determine and eliminate specific source(s) of improper (i.e., faulty) processing engine operation (i.e., the specific portion of program code being executed by the processing engine and/or specific processing engine logic circuits giving rise to such improper operation). Thus, it would be desirable to provide a parallel processing engine having integrated debugging capabilities that make it easier to examine specific internal states of the engine's processors, whereby to facilitate determination and elimination of specific source(s) of improper processing engine operation.

SUMMARY OF THE INVENTION

Accordingly, in broad concept, the present invention provides a parallel processor having a plurality of processing complex elements, which processor includes integrated debug capabilities that permit the processor to overcome the aforesaid and other disadvantages and drawbacks of the prior art. These integrated debug capabilities may be triggered by one or more predetermined events to put processing complex elements (and other elements) of the parallel processor into a debug mode of operation. When a processing element is in a debug mode of operation, the element's internal state may be examined, and the processing executed by the element may be made to following a "single step" mode of operation. In the single step mode of operation, the processing executed by a processing element is halted, and thereafter, may be made to advance, upon command, in single clock cycle increments. The internal states of the element may be examined to facilitate debugging of the element's hardware and program code executed by the element.

In one embodiment of the present invention, the parallel processor may be configured such that, depending upon the type of predetermined event encountered, some or all of the processing complexes may be made to enter debug mode. For example, the processor may be configured to cause all of the processing elements to enter debug mode if either a debug enable signal is supplied to the parallel processor from a source external to the processor, or a processor exception signal is generated. Conversely, the parallel processor may be configured to cause one or more preselected processing elements to enter debug mode in response to entry into debug mode of one or more other processing elements. Each of the processing elements may be configured to enter debug mode if the processing element encounters a preprogrammed instruction and/or data address breakpoint. The respective internal states of the elements may be examined while in debug mode to facilitate debugging of the elements' hardware and program code.

Advantageously, the integrated debug capabilities of the parallel processor of the present invention make it easier to examine specific internal states of the processing elements of the processor, and to determine specific source(s) of improper processor operation than is possible in the prior art. Additionally, since important debug functionality is integrated directly in the processor of the present invention, the need to use external debug hardware and software to provide such functionality may be eliminated. Further advantageously, this permits the complexity of external debug hardware and software used in debugging operations involving the processor of the present invention to be reduced compared to the prior art.

These and other features and advantages of the present invention will become apparent as the following Detailed Description proceeds and upon reference to the Drawings, in which like numerals depict like parts, and wherein:

BRIEF DESCRIPTION OF THE DRAWINGS

The invention description below refers to the accompanying drawings, of which.

Although the following Detailed Description will proceed with reference being made to specific embodiments and methods of use, it should be understood that the present invention is not intended to be limited to these specific embodiments and methods of use. Rather, the present invention should be viewed broadly, as being limited only as set forth in the hereinafter appended claims.

DETAILED DESCRIPTION OF ILLUSTRATIVE EMBODIMENTS

Figure 1:
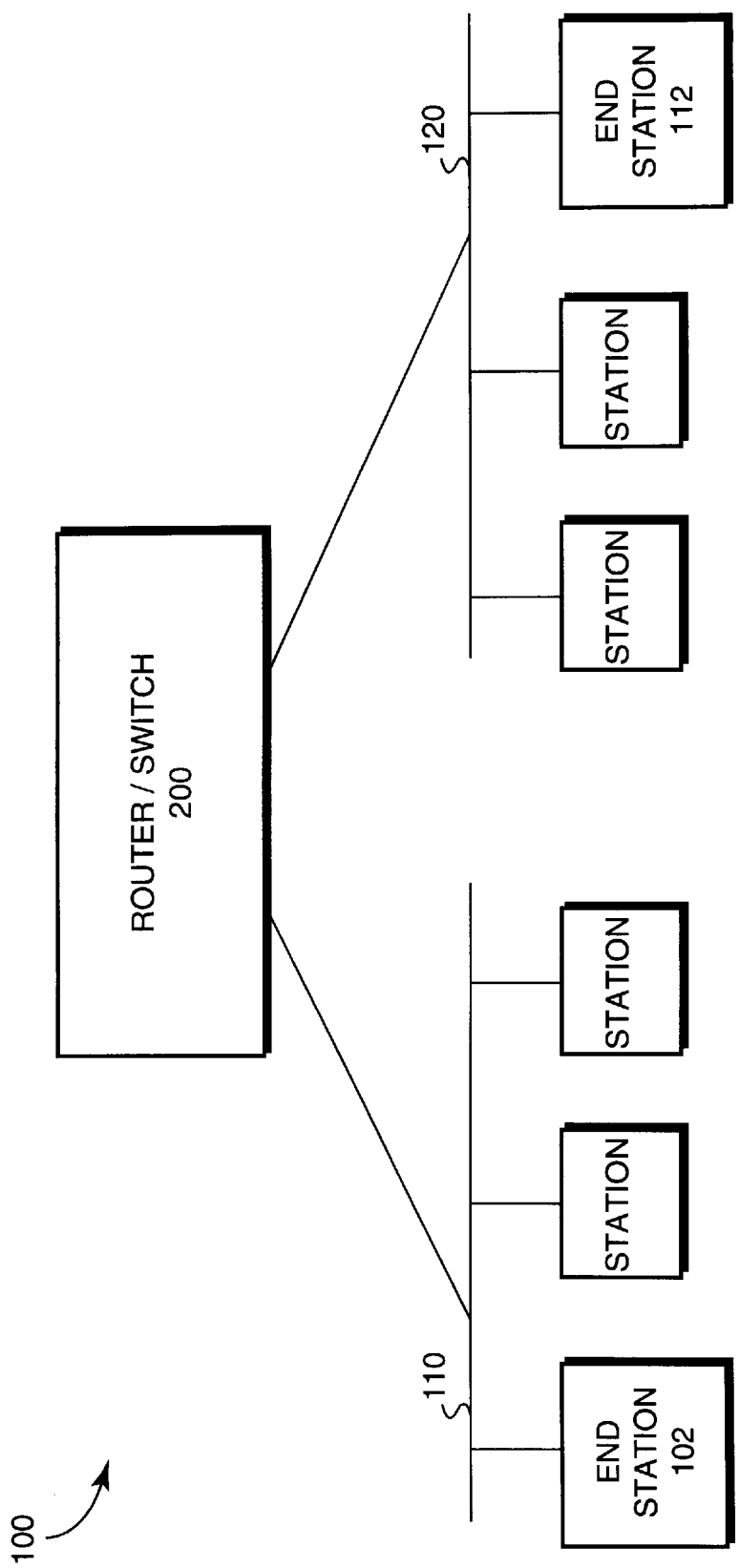
FIG. 1 is a highly schematic diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 2:
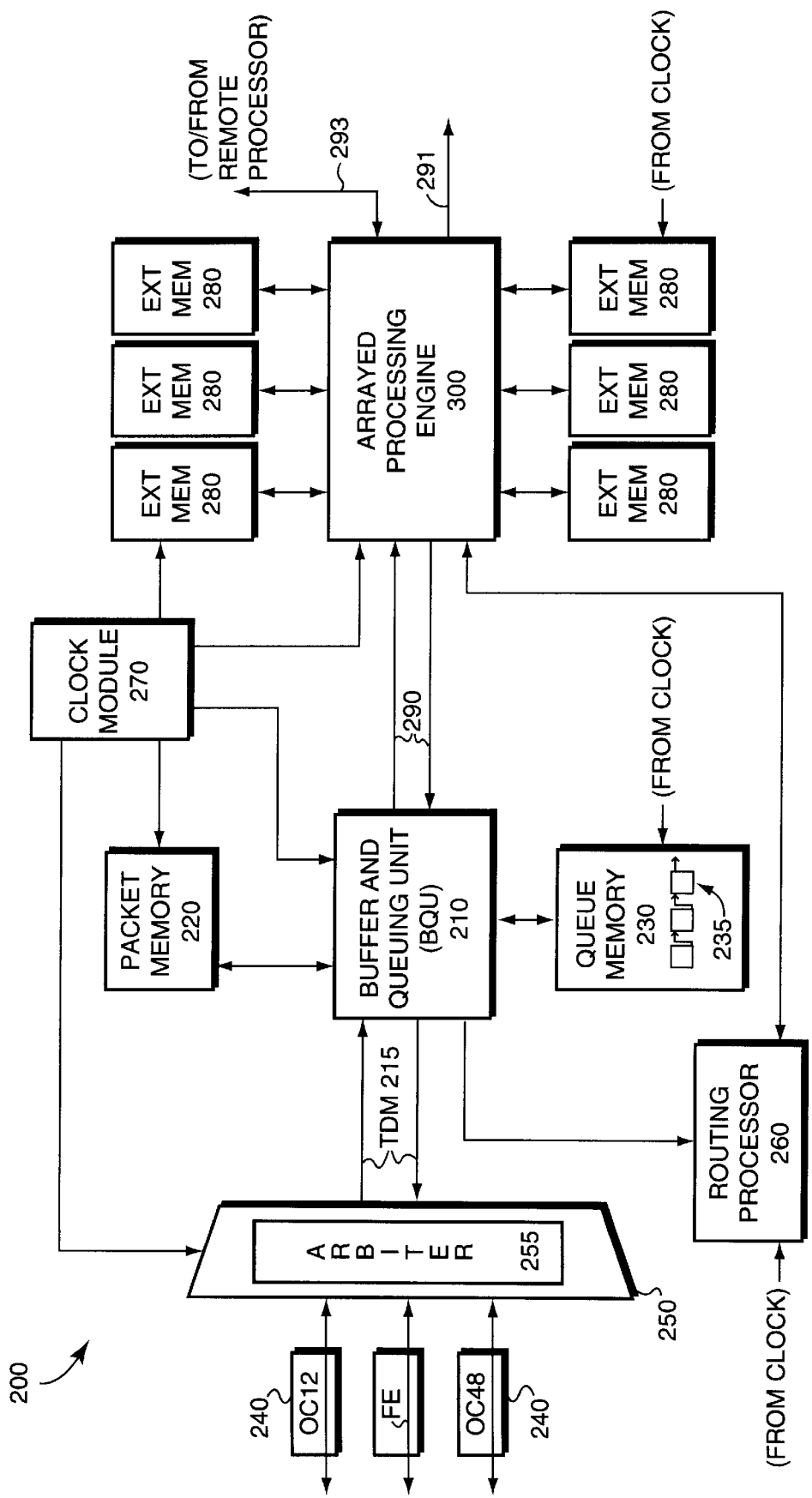
FIG. 2 is a highly schematic diagram of a network switch intermediate station wherein one embodiment of the parallel processor of the present invention may be advantageously used.

FIG. 2 is a schematic block diagram of intermediate station 200 which, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. Thus, a feature of the intermediate station is its ability to be programmed for execution of either layer 2 and layer 3 operations. To that end, operation of the switch will be described with respect to IP switching of packets, although the switch may be programmed for other applications, such as data encryption.

The switch 200 comprises a plurality of interconnected components including an arrayed processing engine 300, various memories, queuing logic 210 and network port interface cards 240. Operations of these components are preferably synchronously controlled by a clock module 270. In the illustrative embodiment, the clock module 270 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the operation of the switch.

The arrayed processing engine 300 is coupled to a memory partitioned into a plurality of external memory (Ext. Mem.) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250. The line cards 240 may comprise OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the switch may include many (e.g., thousands) input/output channels on these interfaces, each of which is associated with at least one queue 235 in the queue memory 230. The processing engine 300 generally functions as a switching processor that modifies packets and/or headers in sequence as the BQU 210 implements queuing operations.

The BQU 210 is preferably implemented as an application specific integrated circuit (ASIC) comprising logic circuitry for implementing conventional queuing algorithms with respect to the queues located in the queue memory 230. In order to perform a queuing operation, conventional queuing logic is provided for, e.g., updating head and tail pointers to the various queues 235 in the memory 230. The BQU also contains buffers for temporarily storing packets prior to delivery to the packet memory 220 along with logic that identifies the locations of the packets in the memory 220. In addition, the BQU 210 maintains control information (e.g., time stamps, correlators) transferred to the processing engine 300 and further includes logic circuits for merging a modified header with a packet prior to forwarding the packet to the selector 250.

The selector 250 comprises an arbiter 255 that implements a fair arbitration policy to control multiplexing of data among the port channels and to synchronize data transfers over a time division multiplexed (TDM) bus 215. The arbiter 255 generally comprises registers and combinational logic configured as a sequential programmable logic circuit that directs bi-directional flow of data between the line cards and the TDM bus through the selector. Additional logic circuits (not shown) of the selector perform physical and data link network layer manipulations to convert input data into a generic form prior to multiplexing the data over the TDM bus in accordance with the arbitration policy.

For IP switching applications, the selector 250 multiplexes fixed-sized units of transient data (e.g., packets) at different rates from all of the cards 240 onto the TDM bus. The multiplexed data is provided to the BQU 210 which extracts a header from the packet prior to loading the packet into the packet memory 220. The BQU then forwards the header to the processing engine 300 over path 290 along with control information specifying the location of the packet in memory 220. Note that in other applications (such as data encryption), the entire packet may be delivered to the processing engine. In the illustrative embodiment, 128 bytes of information are forwarded to the engine, of which 64 bytes comprise a network layer (IP) header transmitted over a data portion of path 290 and the remaining 64 bytes comprise control information transferred over a control portion of the path.

The processing engine 300 processes the header information and returns a modified header which includes the address of the next "hop" station in the network along with additional control information. Illustratively, the engine returns 128 bytes of modified header (64 bytes) and additional control information (64 bytes) specifying onto which queue the modified header should be enqueued. For example, the processing engine may specify, via the control information, that the header should be loaded on a particular logical queue. The BQU then uses the control information to map (correlate) the logical queue to a physical port on a line card.

The BQU 210 generally organizes queuing operations to maintain sequencing of the packets, accommodate latency between the various input/output data rates of the interfaces, provide quality of service (priority) features and, essentially, treat packets from different IP flows differently based on certain parameters. The switch may be organized such that multiple queues of different (high, medium, low) priorities are associated with each output channel and a conventional queuing algorithm may be employed to determine from which queue 235 a packet is chosen for transmission if, e.g., there is congestion on the output channel. It should be noted, however, that the arrayed processing engine could be programmed to implement queuing operations by loading conventional queuing algorithm instructions into the engine.

The switch further comprises a route processor (RP) 260 that executes conventional routing protocols for communication directly with the processing engine 300. The routing protocols generally comprise topological information exchanges between intermediate stations to determine optimal paths through the network based on, e.g., destination IP addresses. These protocols provide information used by the RP 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
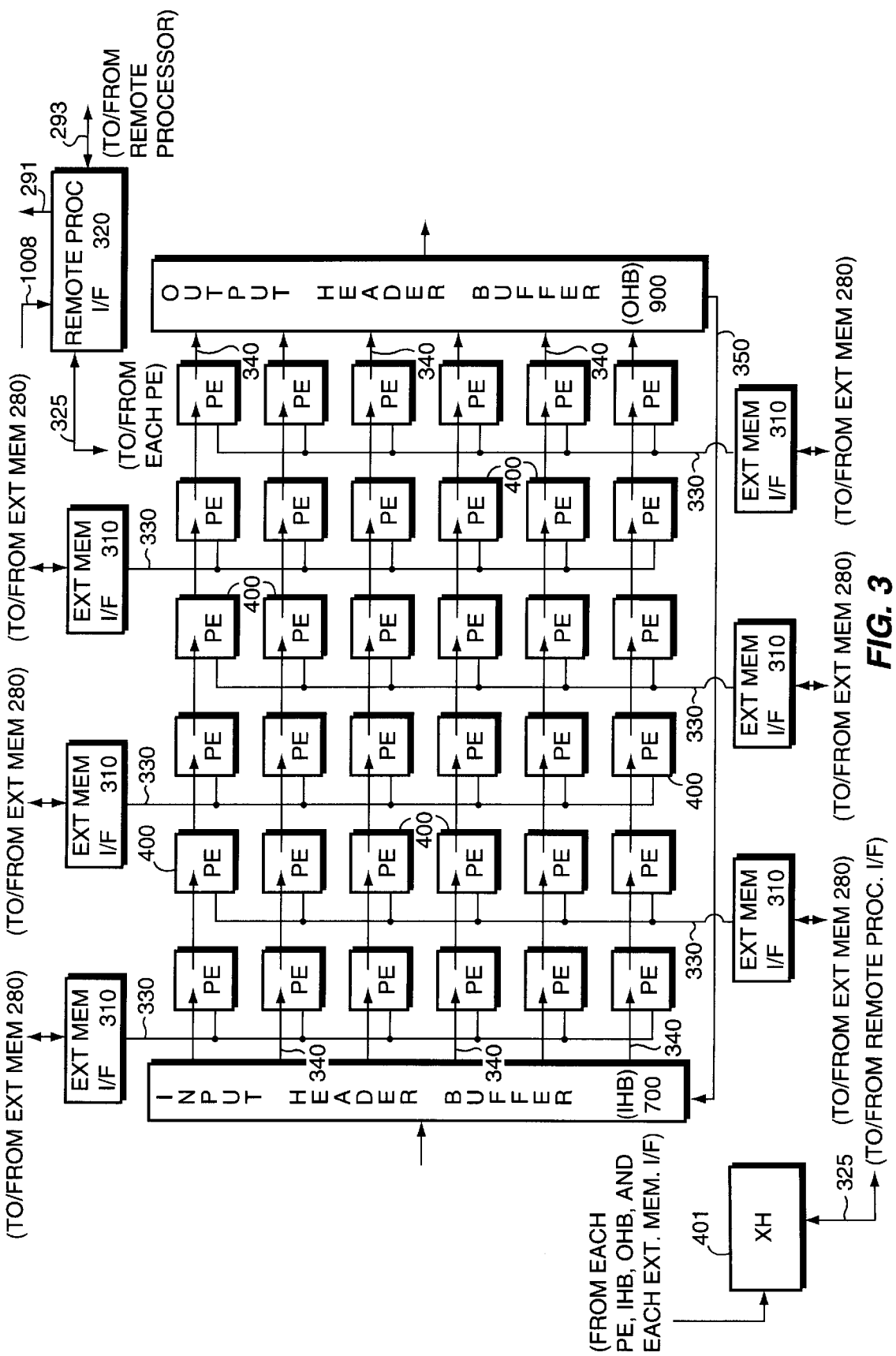
FIG. 3 is a highly schematic diagram of the parallel processor shown in FIG. 2.

FIG. 3 is a schematic block diagram of the programmable processing engine 300 which comprises an array of processing elements embedded between input and output header buffers with a plurality of interfaces from the array to an external memory. The external memory stores non-transient data organized within data structures for use in processing the transient data. The non-transient data typically includes "table" data contained in forwarding and routing tables, statistics, access filters, encryption keys and/or queuing information. Transient data enters and exists the engine via 200 MHz 128-bit input and output data interfaces of the BQU 210. Each processing element contains an instruction memory that allows programming of the array to process the transient data as baseline or extended pipelines operating in parallel. A remote processor interface (RP I/F) 320 provides instructions from a remote processor (not shown) to each PE over a 32-bit maintenance bus 325 having multiplexed address/data lines for storage in their instruction memories. As will be described more fully in connection with the integrated debugging capabilities of the processor 300, the RP I/F 320 also provides (via bus 325) control signals from the remote processor to IHB 700, OHB 900, exception handler (XH) 401, and each interface 310, and provides to the remote processor internal state information from each of these components and each PE received by via 325. Bus 293 permits transmission of the instructions from the remote processor to the RP I/F 320, and transmission of the internal state information to the remote processor from the RP I/F 320.

In the illustrative embodiment, the processing engine 300 comprises a plurality of processing elements (PE) 400 symmetrically arrayed as six (6) rows and six (6) columns in a 6×6 arrayed configuration that is embedded between an input header buffer (IHB) 700 and an output header buffer (OHB) 900; it is important to note, however, that if appropriately modified, the processor 300 may instead comprise a 3×3, 4×4, 4×8 or other arranged rectangular array of elements 400 without departing from the present invention. A 64-bit feedback path 350 couples the OHB 800 to the IHB 700 and provides a data path for recycling data through the PE stages of the processing engine. The PEs of each row are configured as stages connected in series by a 100 MHz 64-bit direct memory access (DMA) data path 340 that synchronously transfers data and control "context" from one PE to the next. This arrangement enables data processing to occur as a high-level pipeline that sequentially executes operations on the transient data. The PEs of each column operate in parallel to perform substantially the same operation on that data, but with a shifted phase.

Figure 4:
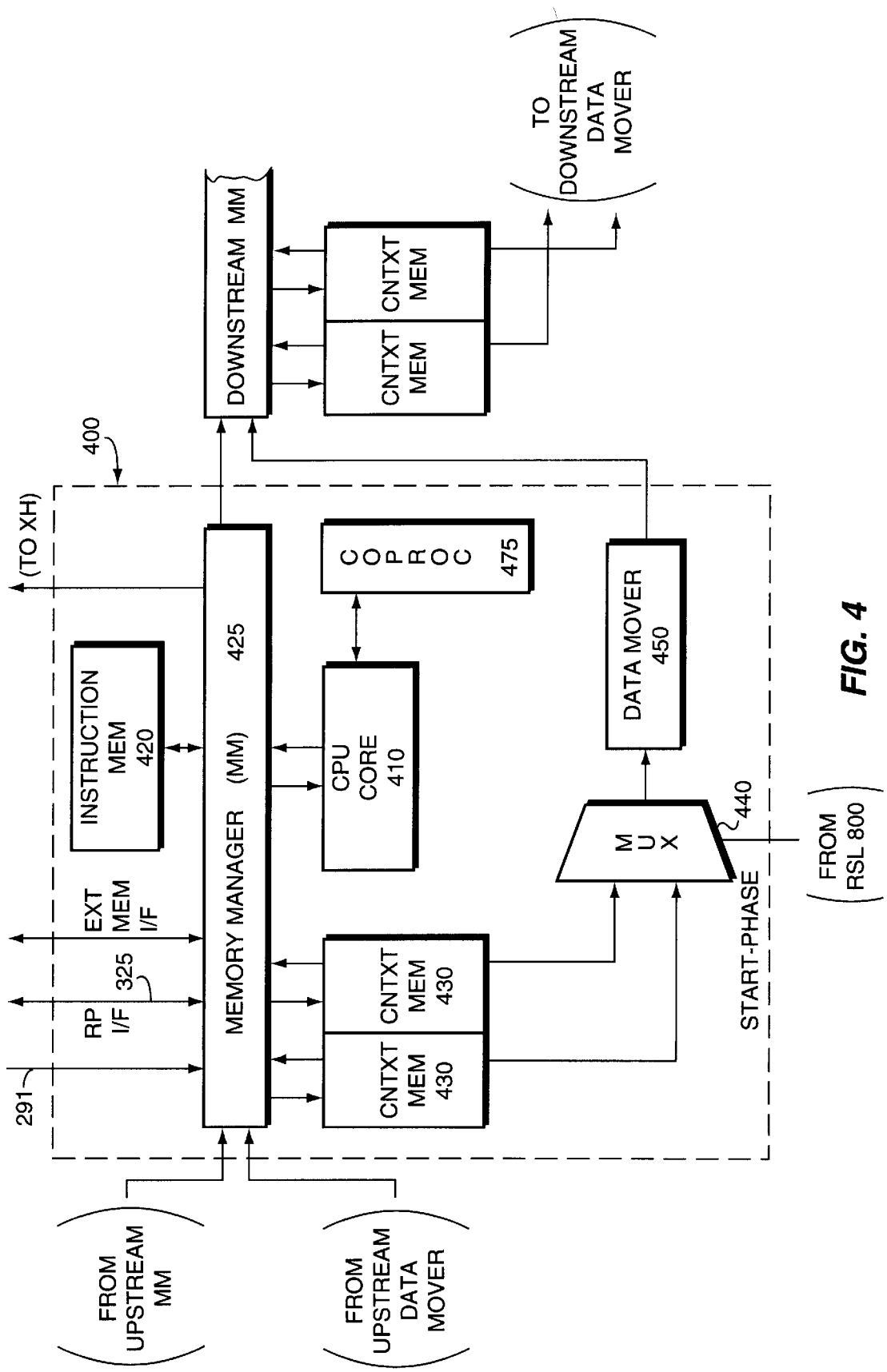
FIG. 4 is a highly schematic diagram of a processor complex element of the parallel processor of FIG. 3.

FIG. 4 is a schematic block diagram of a PE 400. The PE is a processor complex that preferably comprises a central processing unit (CPU) core 410 coupled to an instruction memory 420 and a pair of context data memory (Cntxt Mem) structures 430 via a memory manager (MM) circuit 425. The context memories store transient "context" data for processing by the CPU core in accordance with instructions stored in the instruction memory. The MM 425 provides the instructions and data to the CPU core in response to requests for that information. The MM also provides an interface to a partitioned memory resource configured to store non-transient data, such as table data, for use by the CPU.

The architecture of the PE 400 facilitates passing of context data among the PE stages of the engine in an efficient and accurate manner. To that end, the PE 400 further comprises a data mover circuit 450 that cooperates with the context memories 430 and MM 425 to pass data among PE stages in a manner that maintains data coherency in the processing engine. The data mover generally comprises an address incrementor and interface logic, including a context size register that specifies the length of the data to be moved. An example of a processing complex element suitable for use with the present invention is described in copending and commonly-owned U.S. patent application Ser. No. 09/106,436 titled Architecture for a Processor Complex of an Arrayed Pipelined Processing Engine, which application is hereby incorporated by reference as though fully set forth herein.

Because they perform similar functions, the columned PEs require similar non-transient "table" data. Therefore, the external memory is partitioned into a plurality of external memory (Ext Mem) resources, each of which is dedicated to a respective column of PEs and further configured with non-transient table data needed to support the similar function performed by the columned processor elements. Referring again to FIG. 3, each column has a dedicated 200 MHz 32-bit external memory interface data path (Ext Mem I/F) 310 for accessing the non-transient data.

Partitioning of the external memory so that each PE stage of a pipeline has exclusive access to a dedicated memory resource allows the arrayed processing engine to satisfy high bandwidth requirements of the switch. As noted, processors are typically stalled during external memory references waiting for accessed data. The processing engine architecture obviates the need for memory accesses external to the engine to retrieve transient data by storing the packet data in an internal memory of each PE. Non-transient table data, on the other hand, are stored in the partitioned external memory resources 280. Since all of the PEs in a column perform substantially the same function, only a particular type of table data is stored in each partitioned memory resource 280. For example, the FIB may be stored in a partitioned memory resource dedicated to a particular column of PEs wherein all of the processors share a single copy of the data structure. This technique provides an improvement in memory utilization and system performance over prior attempts wherein all processors of an engine access a shared memory for all types of non-transient table data. In addition, dedicating a partitioned memory resource per column significantly reduces the amount of memory required for the engine.

A memory bus 330 couples each of the columned PEs to its dedicated memory resource. Sharing of a resource, such as bus 330, typically necessitates arbitration to avoid contention among the processor elements. However, each of the columned PEs performs its operation at a different, staggered time with respect to the other columned PEs; therefore, each columned PE requires access to the shared resource at a different time. This type of "shifted phase" relationship between each columned PE and the dedicated resource may obviate the need for arbitration on the bus when accessing the external memory.

Figure 5:
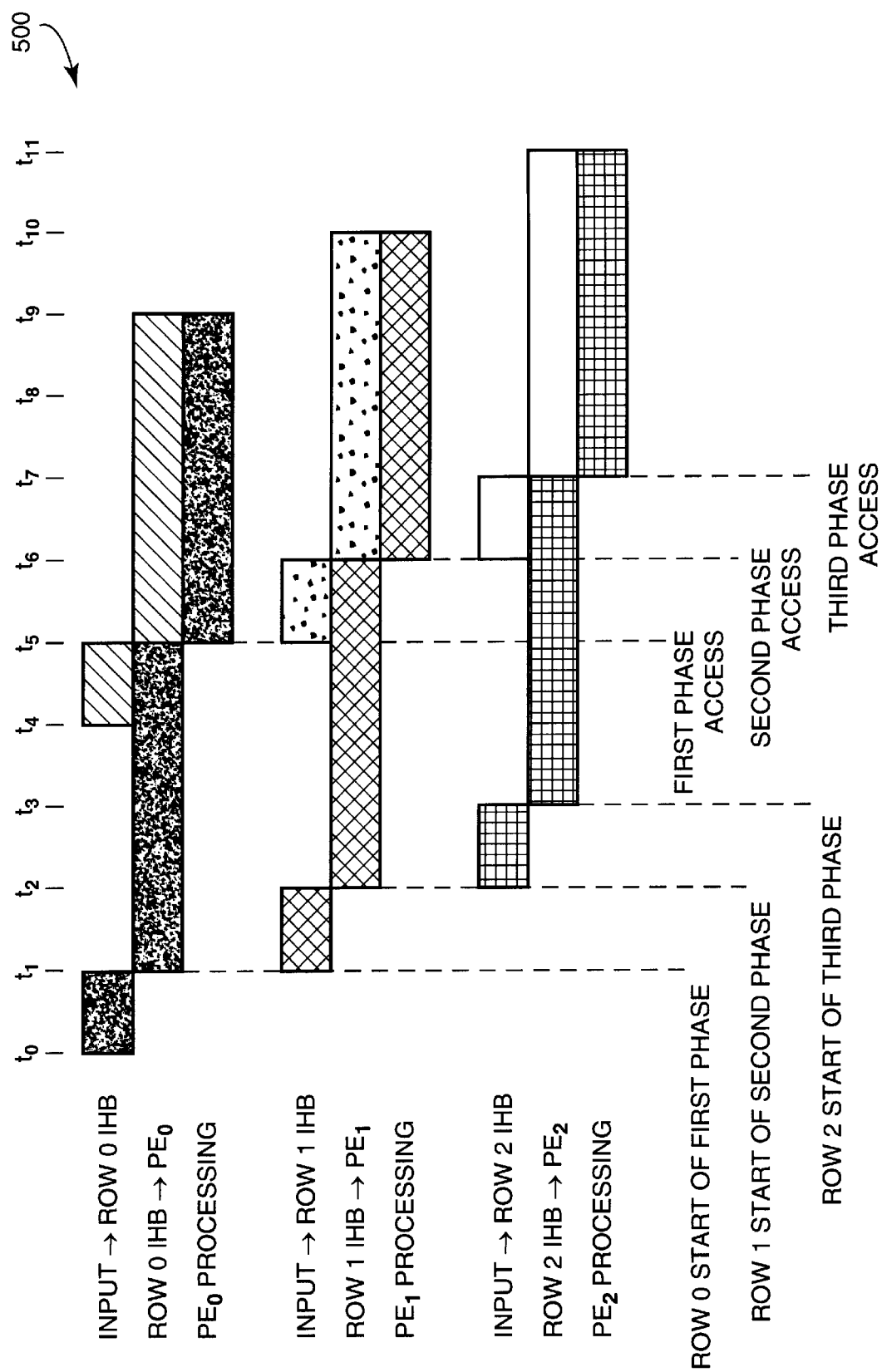
FIG. 5 is a timing diagram illustrating activity among columned processor complex elements of the processor of FIG. 3.

To further explain the staggered nature of activity among the PEs of a column, refer to the timing diagram 500 of FIG. 5. Time $t_0$–$t_1$ represents the amount of time needed to deliver a first packet from the input data interface to an IHB buffer for first row 0 and time $t_1$–$t_5$ is the time needed to deliver the first packet from the IHB to a first PE ($PE_0$) of row 0. Upon receiving the packet, the $PE_0$ starts processing its contents at $t_5$–$t_9$. The IHB delivers a second packet to a first PE ($PE_1$) of a second row 1 at time $t_2$–$t_6$ and $PE_0$ starts processing the packet's contents at $t_6$–$t_{10}$. As noted, $PE_0$ and $PE_1$ execute substantially the s same instruction code since they are aligned in the same column. If the first instruction is a memory access operation, $PE_0$ and $PE_1$ would typically contend for the memory bus to access the memory. At time $t_5$, however, $PE_0$ performs the memory access operation while $PE_1$ receives its packet. Since these processor elements function "out-of-phase", there is no contention on the bus.

More specifically, if the IHB schedules each memory access for each columned PE on each succeeding unit of time (phase), there should be no contention for the memory resource. For example, at a first phase $PE_0$ accesses the partitioned memory, at a second phase $PE_1$ accesses the memory, and at a third phase $PE_2$ accesses the memory. This concept may be extended to any arrayed row/column configuration to ideally eliminate the need for arbitration. In a further extension of this staggered processing feature of the invention, the memory buses 330 and memory interfaces 310 preferably operate twice as fast as the PEs to enable two memory accesses per phase.

Figure 6:
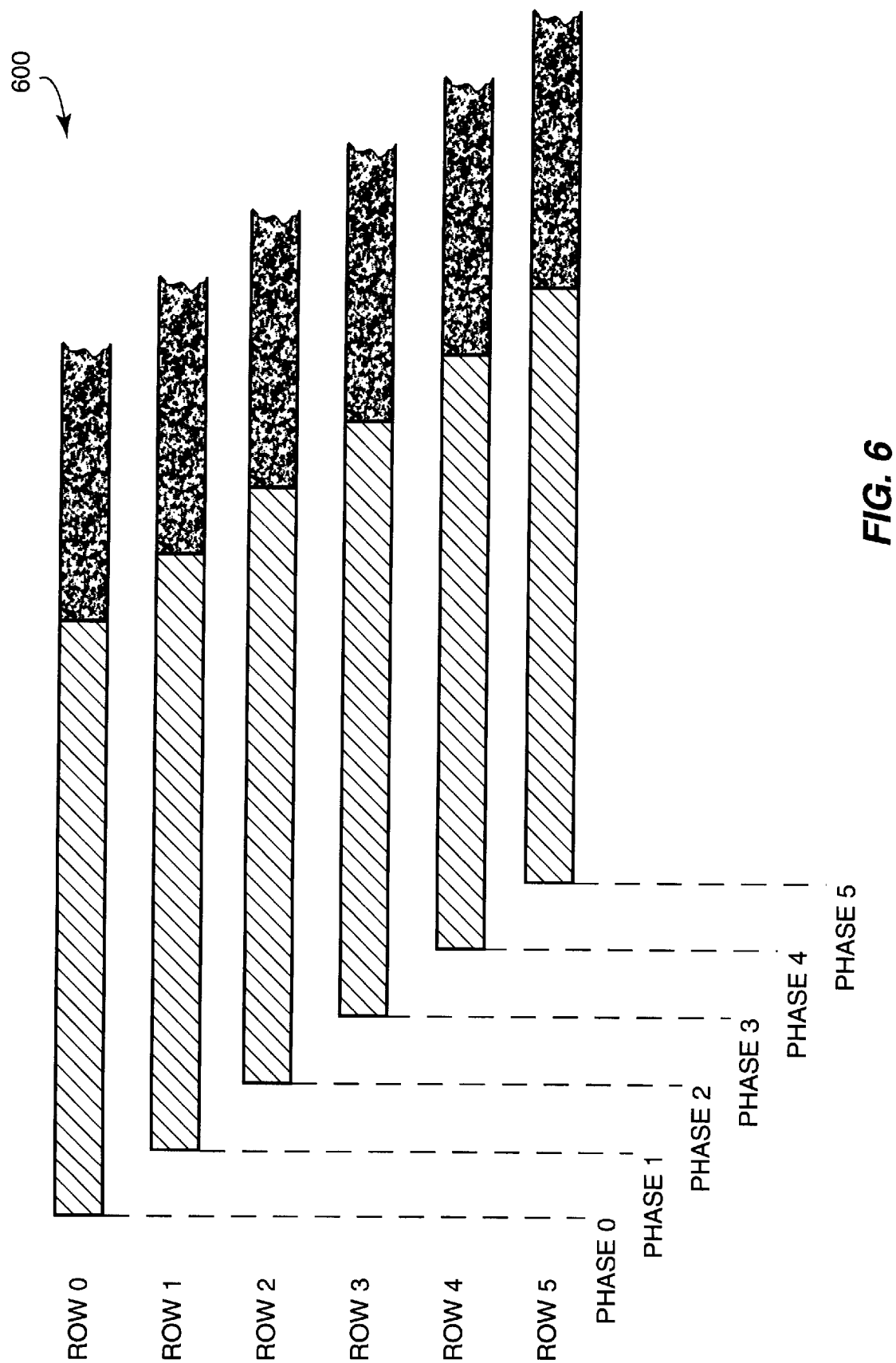
FIG. 6 is a timing diagram depicting processing by processor complex element stages of each pipeline row of the processor of FIG. 3.

FIG. 6 is a timing diagram 600 that depicts processing of transient data in each pipeline row of PE stages. In the illustrative embodiment of the invention, processing within each pipeline is staggered and out-of-phase with respect to adjacent pipelines. Sequencing of the pipelines and, in particular, maintaining the order of packets processed by the pipeline stages is a significant consideration in data communications. If processing is evenly divided among each of the stages of a pipeline such that each stage can perform its work within an allotted phase, then each stage finishes its processing at approximately the same time and the "pipe" advances nicely. However, if a particular stage encounters a problem that delays completion of its task within the allotted time, the remaining stages of the pipeline stall waiting for that stage to complete its task. Furthermore, the remaining pipelines of the engine that are processing subsequently-received packets also stall waiting for the delayed stage. If pipelines are allowed to advance without knowledge of the progress and status of each other, it is possible that those pipelines processing subsequently-received packets may complete prior to the pipeline processing a previously-received packet, thereby resulting in out-of-order sequencing of packets.

In FIG. 6, each line represents a pipelined row of PE stages wherein the crosshatched portion of each line represents processing performed on a first packet loaded into each row. Once processing is finished on those packets, the solid line represents processing performed on a subsequent packet loaded into each row. As can be seen, packet processing and completion (along with the initiation of subsequent packet processing) are staggered in time. If completion of packet processing in row 2 is delayed for a period of time, then completion of packet processing in rows 3 and 4 are delayed for that period; moreover, subsequent processing of packets by the engine is commesurately delayed to maintain the order of packet sequencing. As noted, packet sequencing is a significant consideration in data communications and out-of-order completion of processing may be costly in terms of time needed to restore sequencing. The packet ordering and sequencing aspect of the invention allows implementation of the processing engine architecture with many different applications, such as asynchronous transfer mode (ATM) applications.

Figure 7:
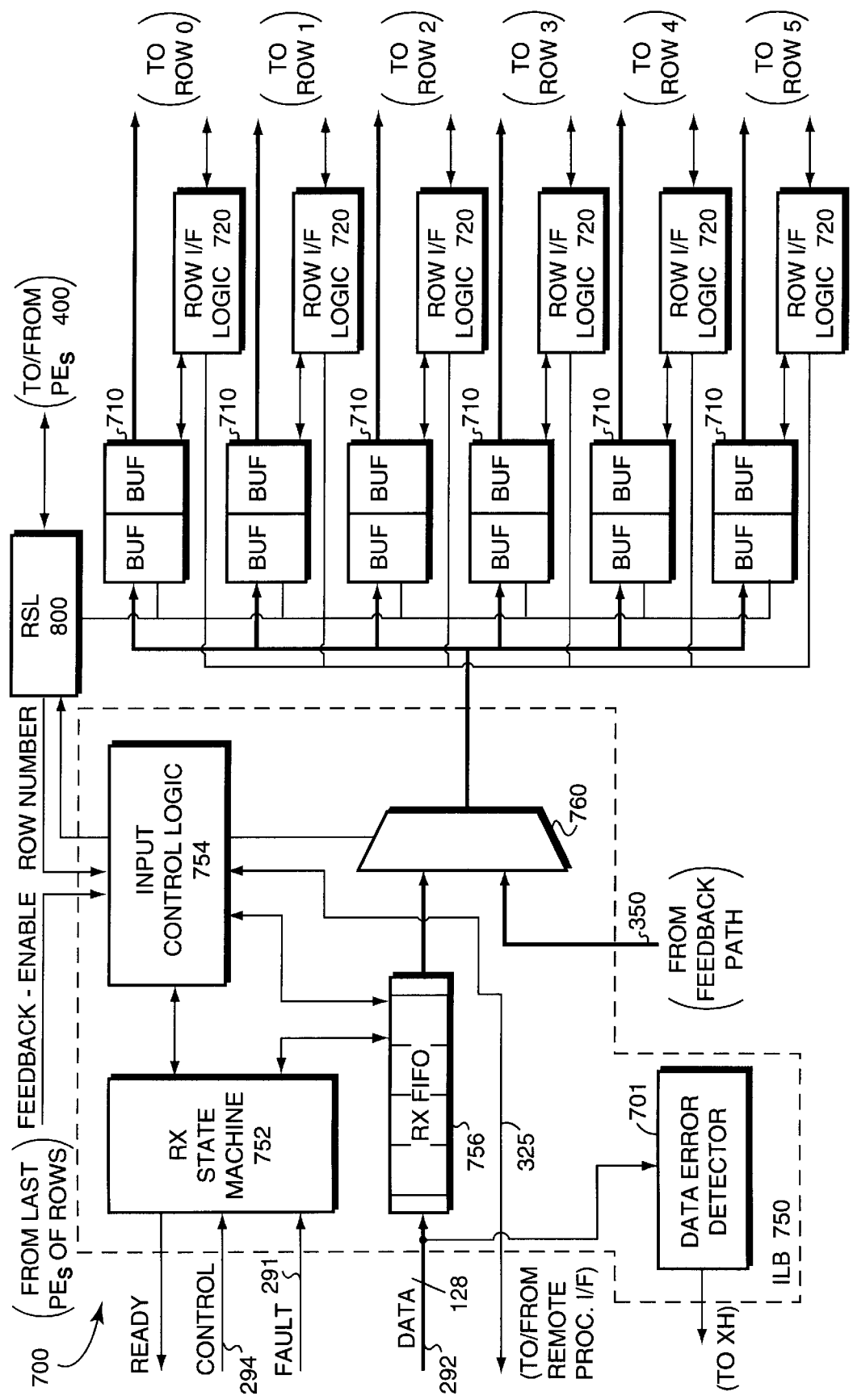
FIG. 7 is a highly schematic diagram of the input header buffer of the processor of FIG. 3.

FIG. 7 is a schematic block diagram of the IHB 700 which functions as a sequencer circuit to control the PE stages of the processing engine such that the columned PEs may performs their operations at staggered, shifted phases with respect to each other. To that end, a new phase for each row is started by the IHB when all of the PE stages finish processing their current "context" and new, incoming context is completely received for that row from the data interface or feedback path, and the context in the OHB for that row has been transmitted. The IHB 700 receives data context from either the data interface of the BQU 210 or from the feedback path 350 and provides the context to each pipeline in succession with feedback data context generally having priority over incoming data context. The data interface preferably includes a path 290 comprising a 128-bit data portion 292 and a control portion 294 for transferring predetermined control signals that manage the flow of data to (and from) the engine. Broadly stated, the IHB advances a pipeline row and provides a packet to a first stage of a next row in response to a completion signal from each stage of the rows. In the illustrative embodiment, all of the pipelines generally advance at the same time so that if one stage of a pipeline stalls, then all of the pipelines stall.

The IHB 700 comprises a plurality of buffer pairs (BUF 710), similar to the context memories 430 of a processor complex element 400, with each pair associated with a pipeline row. As transient data enters the engine, it is sequentially loaded into one of the paired buffers 710 for a particular row before being dispatched to a first stage of that row.

The IHB presents a context-in/context-out interface (row I/F logic 720) that provides write enable, data and address signals to and from the buffers and context memories; preferably, the logic 720 is substantially identical to the data mover 450 of each PE 400. This enables the processing engine to scale efficiently, thereby allowing the pipelines to be as "deep" as desired.

The IHB also includes an input logic block (ILB 750) comprising a receive (Rx) state machine 752 coupled to an input control logic circuit 754 and an input buffer 756. The input buffer is preferably organized as a first-in, first-out (Rx FIFO) buffer that sequentially receives and transmits data forwarded to the engine by the BQU 210. The Rx state machine receives the predetermined control signals over path 294 and cooperates with the logic 754 to control the transfer of data from FIFO 756. In addition, the logic circuit 754 controls a multiplexer 760 having inputs coupled to an output of the FIFO and the feedback path 350. As described herein, the logic 754 enables the multiplexer to select one of its inputs in response to a control signal (feedback_enable) provided by the last PE stages of the pipelines. Furthermore, the logic 754 generates write enable signals (in response to a control signal provided by row synchronization logic 800) and buffer addresses that enable the row I/F logic 720 to transfer the contents of the buffers 710.

Figure 8:
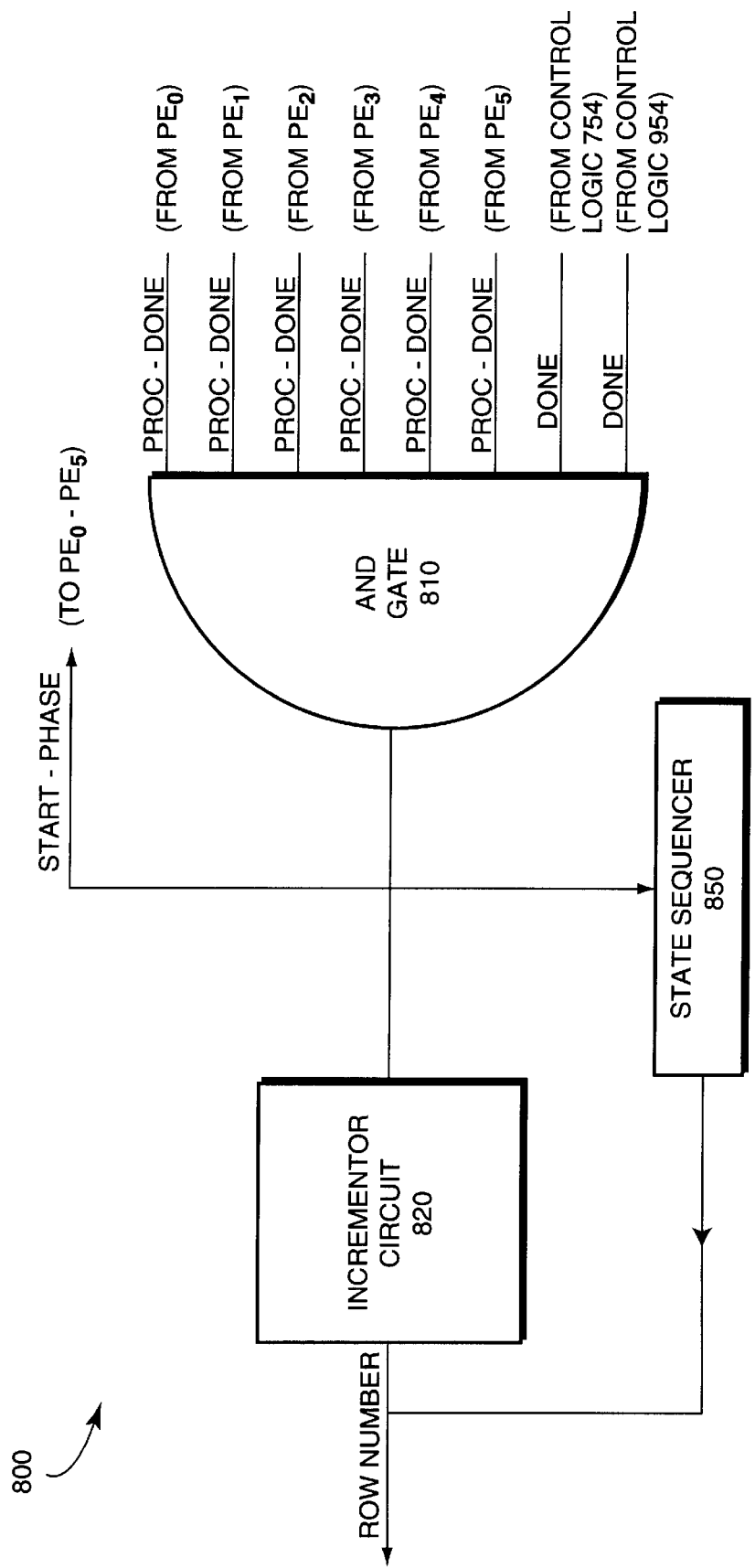
FIG. 8 is a highly schematic diagram of a row synchronization logic circuit of the IHB of FIG. 7.

FIG. 8 is a schematic block diagram of row synchronization logic (RSL) 800 that controls the pipelines by ensuring that each PE stage completes its processing of current context prior to loading new context at a new phase. To that end, the RSL comprises logic circuitry associated with each pipeline row of the arrayed processing engine. For ease of depiction, circuitry associated with one row will be described, although it will be understood to those skilled in the art that the circuitry associated with the other rows are substantially similar.

The RSL 800 receives processing completion status from each PE stage prior to advancing the pipelines. Specifically as each PE 400 finishes its task, it asserts a global pipeline completion signal (proc_done) that is collected by a logic circuit, schematically shown as an AND gate 810. Other completion signals (done) are provided as inputs to the gate from the control logic 754, 954. In response to assertion of all completion signals, the gate 810 generates a beginning of next phase signal (start_phase). The start_phase signal informs each PE stage that there is valid context data in its context memory that its CPU core can begin processing. In addition, start_phase signal is transformed by an incrementor circuit into incremented row number, while being analyzed by a state sequencer circuit 850 prior to being fed to the input control logic 754.

Operationally, transient data enters the processing engine at the IHB, where it is loaded (multiplexed) into an available pipeline row of PE stages. The start_phase signal is asserted to initiate processing by the PE stages and, when they complete, the PE stages assert proc_done signals. The proc_done signal is preferably generated by a co-processor (coproc 475 of FIG. 4) of each processor complex element in response to a context switch instruction provided by the CPU core 410. In the meantime, the ILB loads context data into a buffer 710 of a row specified by the row number and address generated by the logic 754. In the illustrative embodiment, each buffer 710 has eight (8) entries, with each entry having a length of 128 bits (8×128). The input control logic 754 includes an incrementor (not shown) that cooperates with the RSL to generate addresses and write enable signals (e.g., address 0 write_enable, address 1 write_enable, address 2 write_enable) to transmit the 64-bit data over the 64-bit data path 340 coupling the PE stages to the IHB. Thus, the entire contents of a buffer 710 may be transmitted via 16 data transfer operations over the data path.

After loading the context (or deciding that there is no context to load), the buffer 710 asserts the done signal provided to gate 810. Assertion of each gate input generates the start_phase signal which is provided to the state sequencer 850 and the incrementor 820, the latter of which increments the row number. The incremented row number instructs the control logic 754 to load a next row's buffer with the next context in accordance with incremented addresses provided by the control logic 754. Substantially simultaneously, the start_phase signal is provided to each of the PE stages to initiate a next processing phase for the context data loaded into the pipeline.

For the 6×6 arrayed configuration, the transient data works its way synchronously across the pipeline stages at approximately one-fourth the rate that its enters the engine. During each phase, each processing element stage of the pipeline loads the transient data into its context memories, executes programmed instructions, performs internal and external memory access (read or write) operations, as appropriate, and moves the potentially modified transient data to a next stage. When the data reaches the end of pipelined row, it may either exit the engine from the OHB and/or return to the IHB via the feedback path. As described further, the feedback path facilitates data replication for applications such as multicast packet replication and fragmentation, as well as enables extension of a logical pipeline for more than 6 stages.

Although in the illustrative embodiment all of the pipelines may advance or stall at the same time, the state sequencer 850 may be employed to provide a "speed-up" technique that enhances this arrangement. For example if all stages of a first pipelined row complete, the sequencer may allow that pipeline to advance, whereas if a stage of the second pipelined row stalls, the sequencer prevents advancement of that pipeline (and subsequent pipelines of the engine) until each stage of the second pipelined row completes. The state sequencer 850 includes conventional circuitry for implementing a state diagram that administers advancement of the pipelines by ensuring that certain pipelines advance while others stall. This technique preserves the order of packet processing and sequencing through the processing engine.

Figure 9:
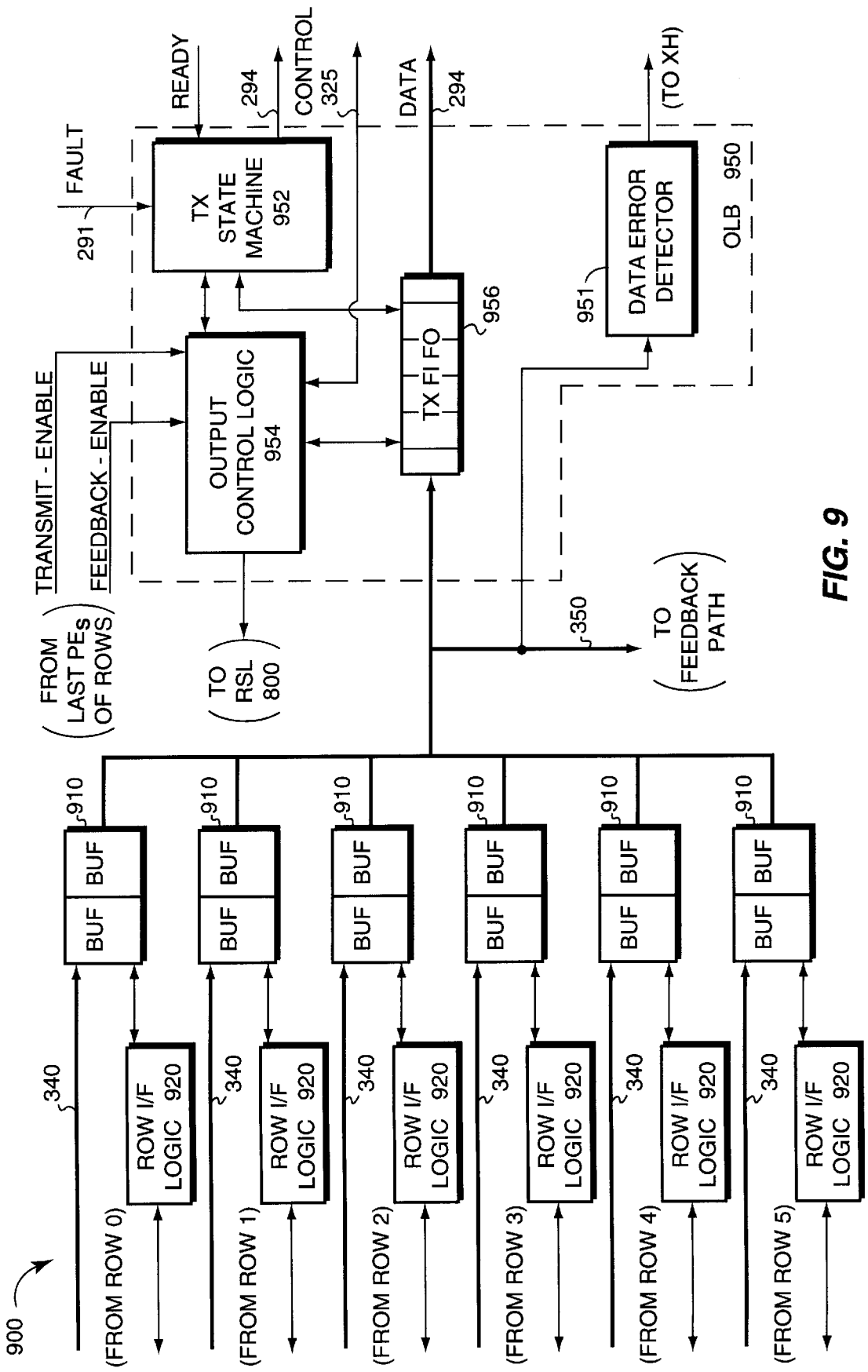
FIG. 9 is a highly schematic diagram of an output header buffer (OHB) of the processor of FIG. 3.
Figure 10:
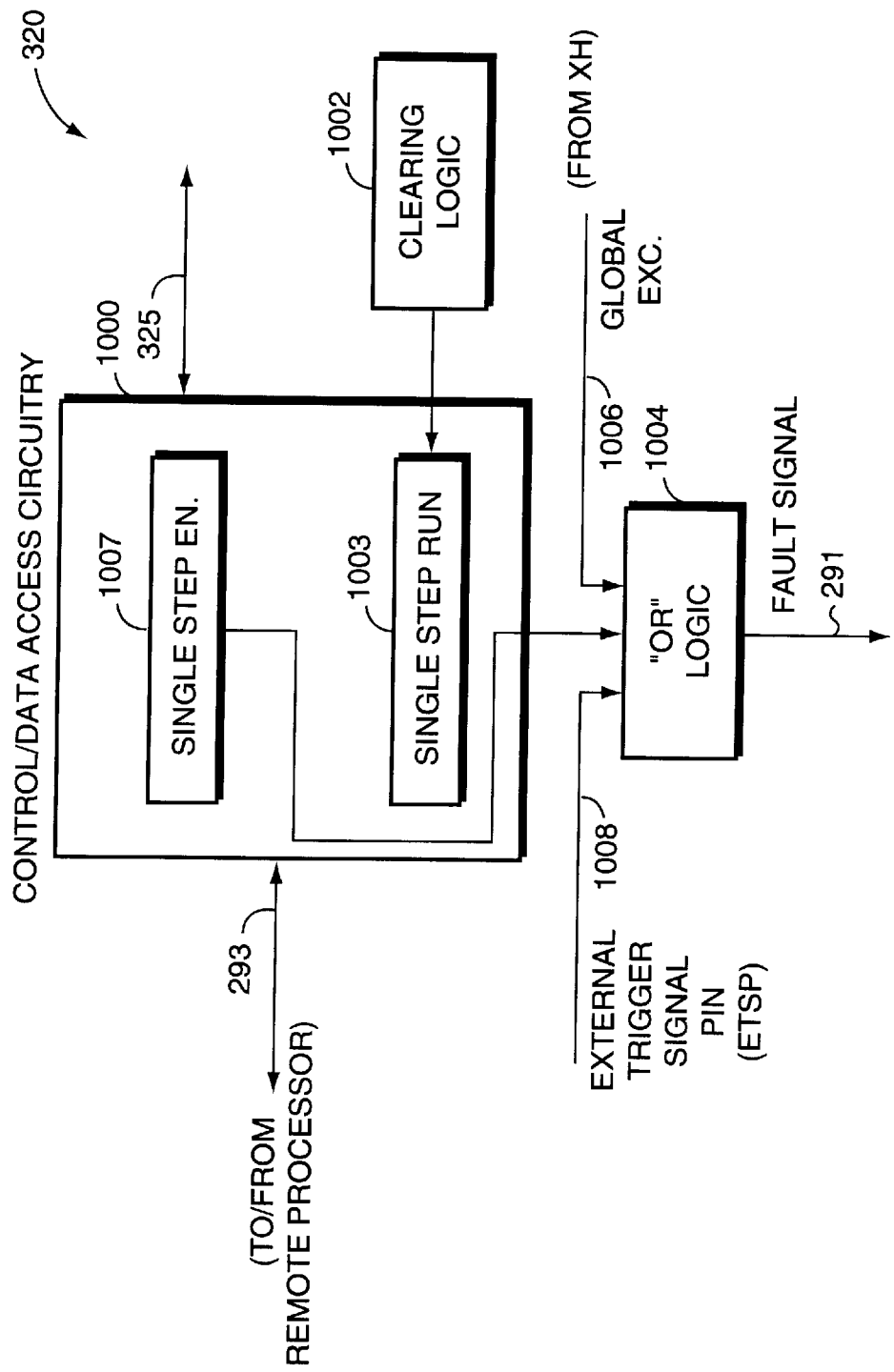
FIG. 10 is a highly schematic diagram of logic contained in the remote processor interface of the processor of FIG. 3.

Upon completion of processing by all of its stages, a pipeline row is selected to deliver its data to the OHB 900 in a synchronous manner. FIG. 9 is a schematic block diagram of the OHB 900 whose internals are substantially similar as those of the IHB 700. That is, the OHB comprises a plurality of buffer pairs (BUF 910), each of which is associated with a pipeline row for receiving data processed by the row. Row I/F logic 920 provides write enable, data and address signals to and from the buffers and context memories of the PEs. In addition, the OHB includes an output logic block (OLB 950) comprising a transmit (Tx) state machine 952 coupled to an output control logic circuit 954 and an output buffer organized as a Tx FIFO 956 that sequentially transfers data from the engine to the BQU 210.

When a selected row indicates that its current data is completely processed and placed in its OHB's buffer 910, the co-processor 475 of a last PE stage in the row generates two control signals: a transmit_enable signal and a feedback_enable signal. These signals are fed to the output control logic 954 outside of the data path 340 and are decoded by the logic 954 to determine the destination of the data. For example, the two control signals <1:0> may be decoded as follows: '00'=nowhere (discard data), '01'=transmit from engine, '10'=transmit over feedback path, '11'=transmit from engine and over feedback path. If it is determined that the data will be sent outside of the engine, the data is loaded into the Tx FIFO 956 where the Tx state machine 952 sends it over the data path 292 of the data interface; otherwise, the data is fed over the feedback path 350 to the IHB 700. Note that for transmissions over the feedback path, the data arrives at the IHB in time for use by the next pipeline row during the next phase.

As noted, the feedback_enable signal is also provided to the input control logic 754 of the IHB 700 which includes logic for accommodating the feedback path 350. When asserted, the feedback_enable signal instructs the multiplexer 760 to accept the data present on the feedback path and, effectively, block the new incoming data. A feature of the feedback path 350 is the ability to extend an otherwise baseline pipeline (which, for a 6×6 array, is a 6-stage pipeline) by additional stages and, thus, enable further processing of a packet without stalling the other pipelines. Rather than being forwarded out of the OHB, the packet is wrapped around over the path 350 and loaded into another pipeline to complete processing. The feedback path can be employed to essentially create (for the 6×6 array) 6 extended pipelines. That is, any row can be extended indefinitely by any multiple of the pipeline stages (e.g., a 4 stage pipeline can be extended to 8, 12, 16 etc. stages whereas a 6-stage pipeline can be extended to 12, 18, etc. stages).

The feedback aspect of the processing engine architecture also facilitates multicasting operations for packets. A multicast operation involves forwarding of multiple copies of a packet to multiple destinations. When a processed multicast packet reaches the output stage, the OHB 900 not only forwards the packet over the data path 292, but also forwards a copy of the packet over the feedback path 350 to the IHB 700. There, the packet is loaded onto an appropriate pipeline for processing. In the illustrative embodiment, a packet transferred over the feedback path has priority over other incoming packets received at the IHB. That is, a packet present on the feedback path must be accepted into a pipelined row prior to an incoming packet. The IHB "blocks" the incoming packets via conventional a flow-control mechanism, such as the multiplexer 760.

As noted, a typical application of the arrayed processing engine involves IP switching wherein the header of a packet is extracted and passed through a pipeline for processing while the entire packet, including the data payload, is stored in the packet memory. However, the engine may be programmed for use in other processing applications, such as encryption or data compression for the entire packet. For example a conventional encryption algorithm, such as data encryption standard (DES), may be modified to accommodate the multi-staged PE pipeline where actual DES lookups are performed by the PE stages using their partitioned memory resources 280 in accordance with the programmed instructions. That is, the entire packet is apportioned and fed through the stages of the pipeline where encryption functions are performed in software. By dividing the DES tables among the various dedicated memory resources, parallelism can be invoked for such feature processing.

The programmable arrayed processing engine is scaleable such that, for each processor improvement in switching speed, the processing engine 300 can be programmed so that each processor may perform more processing on a particular context. That is, the ratio of overhead needed for passing context versus time spent processing improves which allows the solution to scale. For example, if it takes 360 processor cycles to do a particular task and there are 36 processors in the arrayed engine, the task can be divided into 10 cycles per processing stage. A portion of those cycles are consumed by overhead operations associated with passing the packet context.

With reference now being made to FIGS. 3–10, the integrated debugging capabilities of the processor 300 of this embodiment of the present invention will now be described. Processor 300 includes RP I/F 320 which includes control/data access circuitry 1000. Circuitry 1000 receives control signals from the remote processor via the bus 293 which are used to control operation of each PE, each memory interface 310, IHB 700, OHB 900, and XH 401, and provides the remote processor access to data generated by these components that is indicative of the respective internal states of these components. That is, as will be described in greater detail below, circuitry 1000 is configured to permit the remote processor, by supplying appropriate control signals to the circuitry 1000, to read and write values in internal registers of interface 320, elements 400, interfaces 310, IHB 700, OHB 900, and XH 401 so as to permit the remote processor to control and monitor operation of the processor 300.

For example, interface 320 includes single step enable and single step run control registers 1007, 1003, respectively. The remote processor may, by issuing appropriate commands to the circuitry 1000, cause the circuitry 1000 to write values into these registers that enable and control execution of debug features of the processor 300. More specifically, when the remote processor wishes the processor 300 to enter a global debug mode of operation from a normal (i.e., non-debug) mode of operation, the remote processor issues commands to the circuitry 1000 via bus 293 that cause the circuitry 1000 to write into the register 1007 a debug enable or "set" value that, when supplied to the "OR" logic 1004, causes logic 1004 to generate a global fault signal. Logic 1004 is also configured to generate this fault signal upon supply of an appropriate debug trigger signal supplied thereto from an external source (e.g., a not shown logic analyzer system) coupled to external trigger signal pin (ETSP) 1008, or supply of a global exception signal generated by on-chip fault monitoring logic and collected by the XH 401.

Once generated, the global fault signal is supplied via line 291 to the MM 425 of each PE 400, state machine 752 of the IHB 700, and state machine 952 of the OHB 900. Additionally, line 291 comprises an external connection pin that supplies the global fault signal to the remote processor to provide to the remote processor acknowledgment that the processor 300 is entering global debug mode. The external connection pin of line 291 may also supply the global fault signal to other components (e.g., BQU 210) of the switch system 200, as needed, to provide those components with indication that the processor 300 is entering global debug mode.

When the MM 425 of an element 400 receives the global fault signal via line 291, the MM 425 transmits to the CPU 410 of that element 400 appropriate signals to indicate that it is desired for the element 400 to transition into debug mode from the element's normal mode of operation. In response to receiving these signals from the MM, the CPU provides appropriate signals to the coprocessor 475 to indicate that the element 400 is transitioning into debug mode. The MM 425, CPU 410 and coprocessor 475 then enter debug mode by halting their processing activities (while maintaining their respective internal states), and entering a "single step" processing mode. Thus, processing of each PE 400 is halted.

In the single step mode of operation, prior to undertaking further processing activities, the MM 425, CPU 410, and coprocessor 475 of each element 400 await supply via the bus 325 of a single step run enable pulse (SSREP) from the interface 320. The SSREP is generated by the circuitry 1000 in response to control signals provided thereto by the remote processor via the bus 293, which cause the circuitry 1000 to write into the register 1003 an enable or "set" value indicating that a single step run of the elements 400 is desired by the remote processor 400. Once the SSREP has been asserted by the circuitry 1000, clearing logic 1002 resets the "set" value written into the register 1003 to a default value that does not indicate that single step run of the elements 400 is desired.

In response to receipt of the SSREP by the MM 425 of an element 400, the MM 425 supplies appropriate signals to the CPU 410 to indicate that a single step run of the element 400 is desired. In response to these signals from the MM 425, the CPU 410 supplies appropriate signals to the coprocessor 475 to indicate that the element 400 is undertaking a single step run. In response to these signals, the MM 425, CPU 410, and coprocessor 475 execute processing operations that consume only one clock cycle, and halt immediately thereafter, while maintaining their respective internal states after halting. Thus, the element's processing is halted, but its internal state is maintained. The element's internal/data information may then be interrogated via interface 293 for facilitating debug operations.

Likewise, receipt of the global fault signal by the state machine 752 of the IHB 700 causes the state machine 752 to generate a signal to the input control logic 754 indicating that the processor 300 is entering global debug mode. The state machine 752 then sets the logic state of the "READY" line to indicate to upstream sources of data (e.g., BQU 210) that processor 300 is no longer "ready" to receive further data. The IHB 700 then enters debug mode.

When the IHB 700 is in debug mode, the IHB 700 operates in either a single step or single phase mode of operation, selected by a value written into an IHB command register (not shown) in the IHB 700 (e.g., in logic 754), by the remote processor. More specifically, the IHB command register contains a multi-bit value for controlling operation of the IHB 700, which value is set by the remote processor by issuing appropriate commands to the interface 320. The logic states of two of the bits of this value select whether the IHB 700 operates in single step or single phase mode when the IHB 700 is in debug mode.

If the single step mode of operation is selected when the IHB 700 enters debug mode, the state machine 752 asserts the "READY" line for only a single clock cycle, and thereafter, resets the logic state of the "READY" line to indicate that the IHB 700 is no longer ready to process upstream data. The logic 754 changes the value stored in the IHB command register so as to indicate that neither single step nor single phase mode is selected, and permits the IHB 700 to process data from the BQU, in the manner described previously, during only the single clock cycle; that is, the logic 754 only permits the IHB 700 to carry out a single clock cycle of processing of data from the BQU, and immediately thereafter, causes such processing to halt.

Conversely, if the value contained in the IHB command register causes the IHB 700 to be in single phase mode when the IHB 700 enters debug mode, the logic 754 permits the start of a processing phase for a next active PE row and permits that processing phase to run to completion. (See, FIGS. 5 and 6, and the above discussion related thereto). The logic 754 then changes the value stored in the IHB command register so as to indicate that neither single step nor single phase mode is selected, and causes the IHB 700 to halt processing of data provided by the BQU.

The operation of OHB 900 when the processor 300 is in global debug mode is substantially similar to that of IHB 700, except that, in debug mode, OHB 900 is only capable of single step mode operation. More specifically, when the global fault signal is asserted on line 291, the TX state machine 952 receives the signal, and in response thereto, generates a signal to the output control logic 954 indicating that the processor 300 is entering global debug mode. The OHB 900 then enters debug mode.

The OHB 900 contains an OHB command register (e.g., in logic 954) that contains a multi-bit value for controlling operation of the OHB 900, which value is set by the remote processor by issuing appropriate commands to the interface 320. One of the bits of this multi-bit value is used to select whether the OHB is halted or is permitted to execute a single clock cycle of processing. More specifically, if this bit is set to a value of "1" when the OHB 900 enters debug mode, the logic 954 permits the OHB 900 to execute only that processing that can be carried out by the OHB 900 in a single clock cycle (e.g., one double word of data may be transmitted from the OHB 900 to the BQU 210 in response to assertion of the "READY" input to the state machine 952 by the BQU 210). Logic 954 toggles this bit of the OHB command register value, and causes processing by the OHB 900 to halt.

While the processor 300 is in global debug mode (i.e., while the global fault signal is asserted), the remote processor may repeatedly advance, by discrete single clock cycle steps, the processing of the elements 400 and the OHB 900 by appropriately writing values to the register 1003 and OHB command register via the interface 320. Likewise, the remote processor may repeatedly advance, by discrete, single clock cycle steps or single processing phases, the processing of the IHB by writing appropriate values to the IHB command register via the interface 320. Conversely, if the remote processor resets the value contained in the enable register 1007 such that it no longer indicates that global debug mode is desired for the processor 300, and if the global exception or external trigger signals are not being asserted via the lines 1006, 1008, respectively, then the global fault signal is no longer generated on line 291 by the interface 320; this causes the elements 400, IHB 700, and OHB 900 to cease being in debug mode, and to return to their above-described normal operations. Of course, elements of processor 300 in addition to the elements 400, IHB700, and OHB 900 may be configured to enter respective debug modes of operation. For example, all of the functional blocks of the processor 300 may be configured to enter a single step debug mode of operation, utilizing techniques used to accomplish same in the components 400, 700, and 900. Furthermore, components 400, 700, and 900 may be configured such that their respective debug modes are not coupled together. That is, components 400, 700, and 900 do not necessarily all have to be in respective debug modes contemporaneously.

XH 401 receives inputs from the IHB 700, OHB 900, and each PE 400 and interface 310. These inputs permit each of these components 700, 900, 400, 310 to indicate to the XH 401 when a "fatal" or global exception has been encountered by the respective component. More specifically, as shown in FIGS. 7 and 9, each of the IHB 700 and OHB 900 comprises a data error detector 701, 951, respectively. The detectors 701, 951 receive, in parallel with the RX FIFO or TX FIFO, respectively, the data being received or transmitted from the IHB 700 or OHB 900. Detector 701 includes conventional circuitry for scanning the data being provided to the IHB 700 for errors; similarly, the detector 951 includes conventional circuitry for scanning the data being output from the OHB 951 for errors. Upon detection of such an error by either of detectors 701 or 951, an internal exception is generated in the detector discovering the error. The detector discovering the error may then determine whether the error is of a type that is considered "fatal" (i.e., non-recoverable) for which a global debug of the processor 300 is desired. If so, the detector detecting the error condition provides to the XH 401 signals detection of the error condition to the XH 401 and provides the XH 401 an exception identification value that uniquely identifies the component (e.g., IHB or OHB) signaling occurrence of the fatal error condition.

The types of errors that are to be considered fatal errors may be selected by control signals supplied to the detectors 701 or 951 from the remote processor via the interface 320. More specifically, the detectors 701, 951 may be configured to prevent reporting of certain types of exceptions specified by control signals supplied to the detectors 701, 951 by the remote processor.

Each of the elements 400 and interfaces 310 may also include conventional circuitry for detecting occurrences of fatal errors, and for signaling detection of same to the XH 401, together with respective exception identification values. For example, the memory manager 425, CPU core 410, and/or coprocessor 475 of each element 400 may comprise such error detection circuitry, and the memory manager 425 may include circuitry for signaling detecting of same to the XH 401, together with a respective exception identification value for uniquely identifying the element 400 encountering the fatal error condition.

In response to the signaling of the fatal error condition, the XH 401 stores in an exception identification register (not shown) the received exception identification value provided by the component 310, 401, 700, or 900 encountering the condition. The XH 401 then generates and supplies a global exception condition signal to the interface 320 unless generation of same has been disabled by the remote processor. That is, the XH may be configured not to generate a global exception condition signal in response to exception signals from certain components specified by a global exception mask value supplied by the remote processor and stored in a global exception mask register of the XH 401. In response to receipt of the global exception condition signal from the XH 401, the interface 320 generates the global fault signal.

As stated previously, the circuitry 1000 is configured to permit the remote processor to have read and write access to various registers contained in the processor 300 that may be useful to the remote processor in debugging operations. More specifically, circuitry 1000 includes memory access circuitry for permitting the remote processor to write data to and read data from specific registers contained in the processor 300. Among the registers to and from which the remote processor may write and read data, respectively, are various internal registers of the elements 400 (e.g., control and data registers of the memory managers 425, CPU cores 410, and coprocessors 475), IHB 700 (e.g., the IHB command register, and other control and data registers of the IHB), OHB 900 (e.g., the command register, and other control and data registers of the OHB), and the XH (e.g., the global exception mask register, and exception identification register). As will be appreciated by those skilled in the art, by utilizing conventional debugging techniques that involve reading and overwriting contents of appropriate ones of these registers (so as to systematically advance, and examine results of processing of various of the components of the processor 300), and comparing actual contents of such registers with expected values therefor, it may be possible to use a debug software routine executing on the remote processor and/or other debug techniques/processes to diagnose the specific program code and/or logic circuits in the processor 300 giving rise to erroneous behavior of the processor 300.

Turning now to FIGS. 11–14, a variation 300' of the embodiment of FIGS. 1–10 will now be described. It should be understood that unless specifically indicated to the contrary the structure and operation of processor 300' are substantially the same as the structure and operation of processor 300. However, in addition to the debug capabilities comprised in processor 300, conventional BIST circuitry (e.g., of the type specified in IEEE Standard 1149.1, "Standard Test Access Port and Boundary-Scan Architecture," 1990, which IEEE Standard is incorporated herein in its entirety by reference) and other debug circuitry are also comprised in the processor 300' of FIGS. 11–14.

Figure 11:
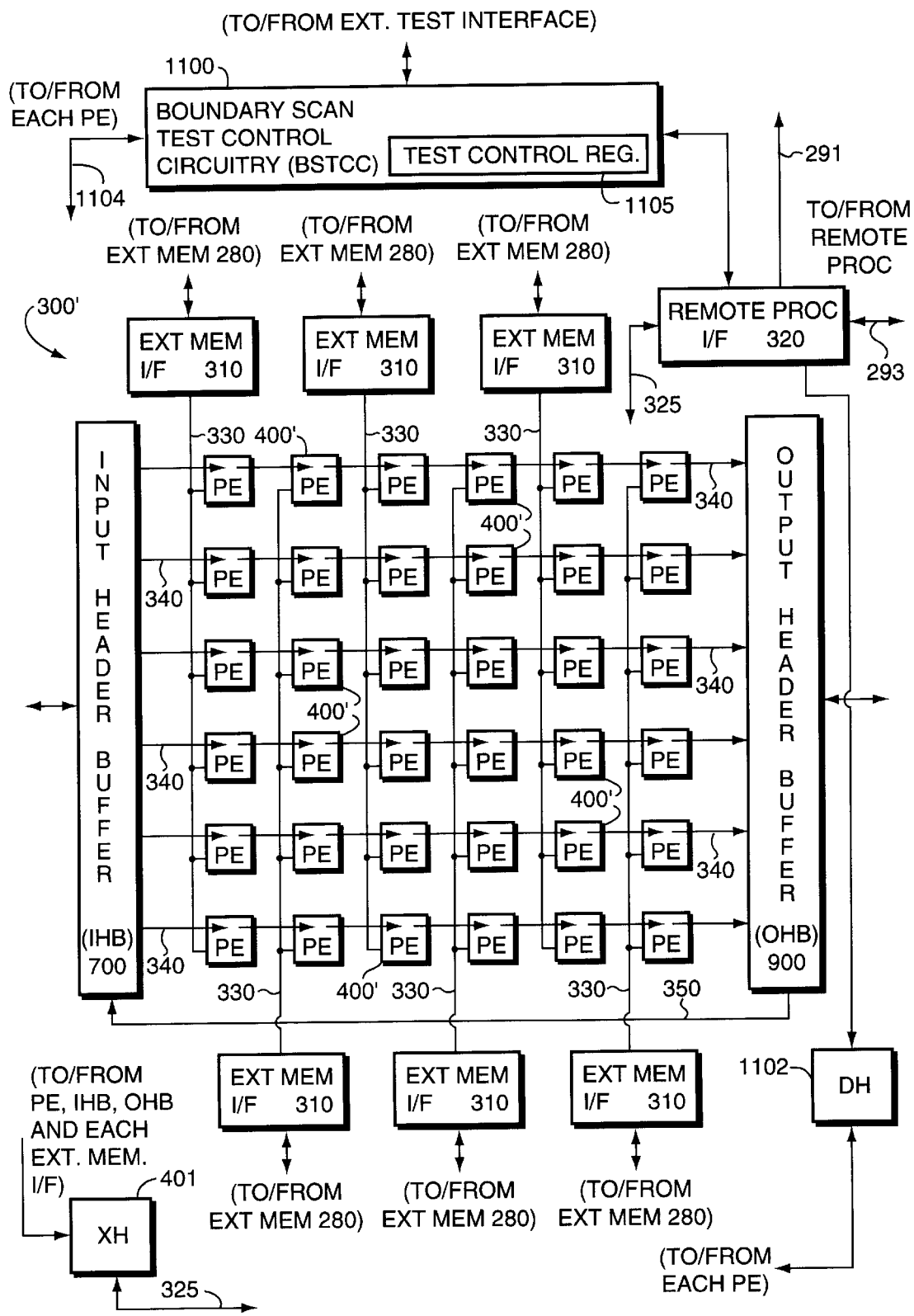
FIG. 11 is a highly schematic diagram of an alternative embodiment of the parallel processor of the present invention in which built in self test (BIST) techniques are employed.

More specifically, as shown in FIG. 11, processor 300' includes conventional boundary scan test control circuitry (BSTCC) 1100 that is coupled to both the interface 320' and to each CPU core 410'. In this embodiment, each core 410' comprises conventional ARM7TDMI circuitry, manufactured by VLSI Technology, Inc. of San Jose, Calif., which includes conventional BIST circuitry, including scan chains, test access port, and associated circuitry (not shown) for testing internal registers and other circuitry of the CPU cores 410'. The BIST circuitry of each core 410' is coupled to BSTCC 1100, and additional processor element breakpoint circuitry shown in FIG. 14. The BSTCC 1100 provides predetermined test data inputs and receives test data outputs from each core 410', which inputs and outputs may be provided from and to, respectively, the remote processor via the interface 320, or a remote debug host system (such as an IBM-type personal computer, not shown) coupled to the BSTCC 1100 via a conventional interface comprised in the BSTCC 1100. Additionally, as will be described more fully below, the BSTCC 1100 may also be used to provide control and data signals for instruction and/or data address breakpoint operations involving some or all of the elements 400'; the control and data signals may be provided from the remote processor and/or the remote debug host system.

BSTCC 1100 includes a test control register 1105 which stores a value supplied thereto from the remote processor or debug host system that determines which of CPU's of the processor 300' undergo scan testing. More specifically, the BSTCC 1100 includes test multiplexer circuitry (not shown) that is configured to be selectably connectable to specific CPU's of the processor 300', based upon the value loaded into the register 1105, so as to permit the specific CPU's selected by that value to be tested using the BSTCC 1100 and the scan testing circuitry comprised in these specific CPU's. Additionally, although not shown in the Figures, the BSTCC 1100 may comprise BIST scan chains for use in testing the overall functionality of the processor 300' (i.e., of the circuitry other than the CPU cores 410'). The test data outputs from the scan chains for testing the functionality of the CPU cores 410' and/or the overall functionality of the processor 300' may be provided to the remote processor and/or host debug system which compare the predetermined test data inputs provided to generate the test data outputs with the test data outputs, and determine from this comparison, using conventional BIST techniques sources of improper functioning of the processor 300' and/or program code running on the processor 300'. Alternatively, the BSTCC 1100 may comprise conventional circuitry for generating the test data inputs, comparing the test data outputs with the test data inputs, and determining from this comparison potential sources of improper functioning of the processor 300' and/or program code running on the processor 300'.

Figure 14:
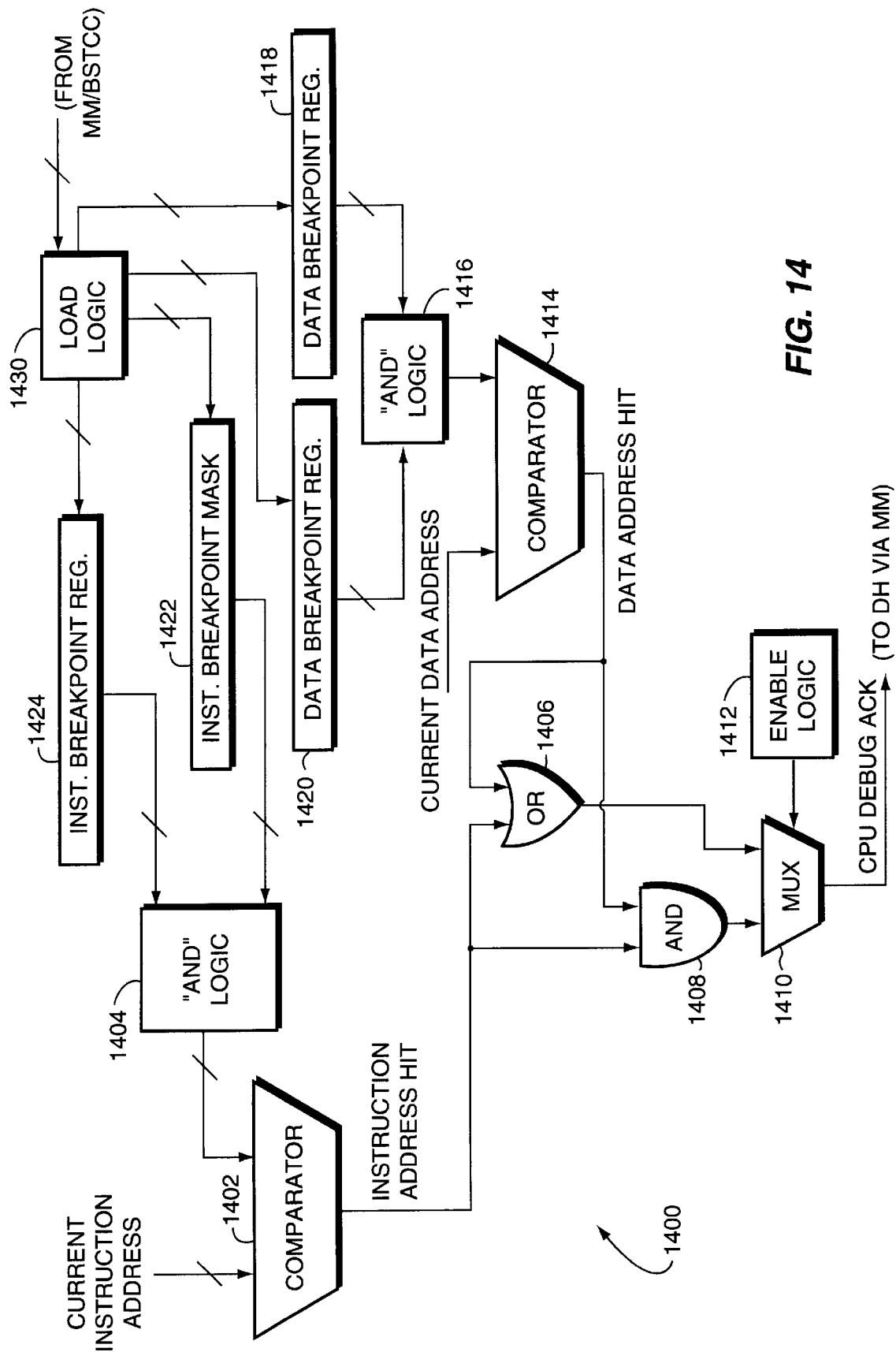
FIG. 14 is a highly schematic diagram of breakpoint detection and debug signal generator logic comprised in each of the processor complex elements of the processor of FIG. 11.

In processor 300', each CPU core 410' includes breakpoint detection and debug signal generator logic 1400. As shown in FIG. 14, logic 1400 comprises load logic 1430 which is controlled by signals provided from the remote processor and/or BSTCC 1100 to load values into instruction breakpoint, instruction breakpoint mask, data breakpoint, and data breakpoint mask registers 1424, 1422, 1420, 1418, respectively. By appropriately selecting the values loaded into these registers 1424, 1422, 1420, 1418, the element 400' comprising these registers may be made to enter a "local" debug mode, and signal such entry to a debug handler (DH) system 1102, upon encountering by the core 410' of one or more instruction and/or data address breakpoints in its processing operations.

Preferably, the values loaded into registers 1424, 1422, respectively, are 14-bit values representative of a desired CPU core instruction address debug breakpoint and instruction address debug breakpoint mask. AND logic 1404 performs a bitwise logical AND operation on these two 14-bit values, and outputs to comparator 1402 the 14-bit result of this operation. Comparator 1402 compares the 14-bit output from the logic 1404 to 14-bit instruction address currently being pointed to by the program counter of the core 410'. A single bit output is generated by comparator 1402 as a result of this comparison, which output is in a high logic state if the two 14-bit values compared by the comparator 1402 are equal to each other, and otherwise, is in a low logic state. This single bit output is indicative of whether logic 1400 has encountered an instruction address breakpoint hit (i.e., whether the current instruction address loaded in the CPU's program counter is a desired instruction address breakpoint, as specified by the values contained in the registers 1424, 1422). The output from the comparator 1402 is supplied, in parallel, as inputs to two-input OR and AND gates 1406, 1408, respectively.

Preferably, the values contained in the registers 1422, 1418, respectively, are 32-bit values representative of a desired CPU core data address debug breakpoint and data address debug breakpoint mask. AND logic 1416 performs a bitwise logical AND operation on these two 32-bit values, and outputs to comparator 1414 the 32-bit result of this operation. Comparator 1414 compares the 32-bit output from the logic 1416 to 32-bit data address currently being accessed by the core 410'. A single bit output is generated by comparator 1414 as a result of this comparison, which output is in a high logic state if the two 32-bit values compared by the comparator 1414 are equal to each other, and otherwise, is in a low logic state. This single bit output is indicative of whether logic 1400 has encountered a CPU data address breakpoint hit (i.e., whether the current data address accessed by the CPU is a desired CPU data address breakpoint, as specified by the values contained in the registers 1420, 1418). The output from the comparator 1414 is supplied, in parallel, as inputs to two-input OR and AND gates 1406, 1408, respectively.

The output of OR gate 1406 is provided as one of the two signal inputs of multiplexer 1410, and the output of AND gate 1408 is provided as the other signal input of multiplexer 1410. Enable logic 1412 is controlled by control signals supplied by the BSTCC 1100 or remote processor to select for output from the multiplexer 1410 one of the two signal inputs supplied to multiplexer 1410. The single bit output from the multiplexer is supplied to DH 1102 as the CPU debug acknowledge signal from the element 400' comprising logic 1400; this signal is also supplied to the MM and coprocessor of the element 400' comprising the logic 1400 and causes the element 400' to enter local debug mode.

By appropriately selecting the value stored in the mask register 1422, compound instruction address breakpoints may be implemented using the logic 1400. Similarly, by appropriately selecting the value stored in the mask register 1418, compound data address breakpoints may be implemented using the logic 1400. Also, by appropriately controlling which of the signal inputs is output from the multiplexers 1410, the CPU debug acknowledge signal may either represent encountering by the logic 1400 of a compound breakpoint (i.e., comprising both instruction and data address breakpoints) or a non-compound breakpoint (i.e., comprising either instruction or data address breakpoints).

Figure 12:
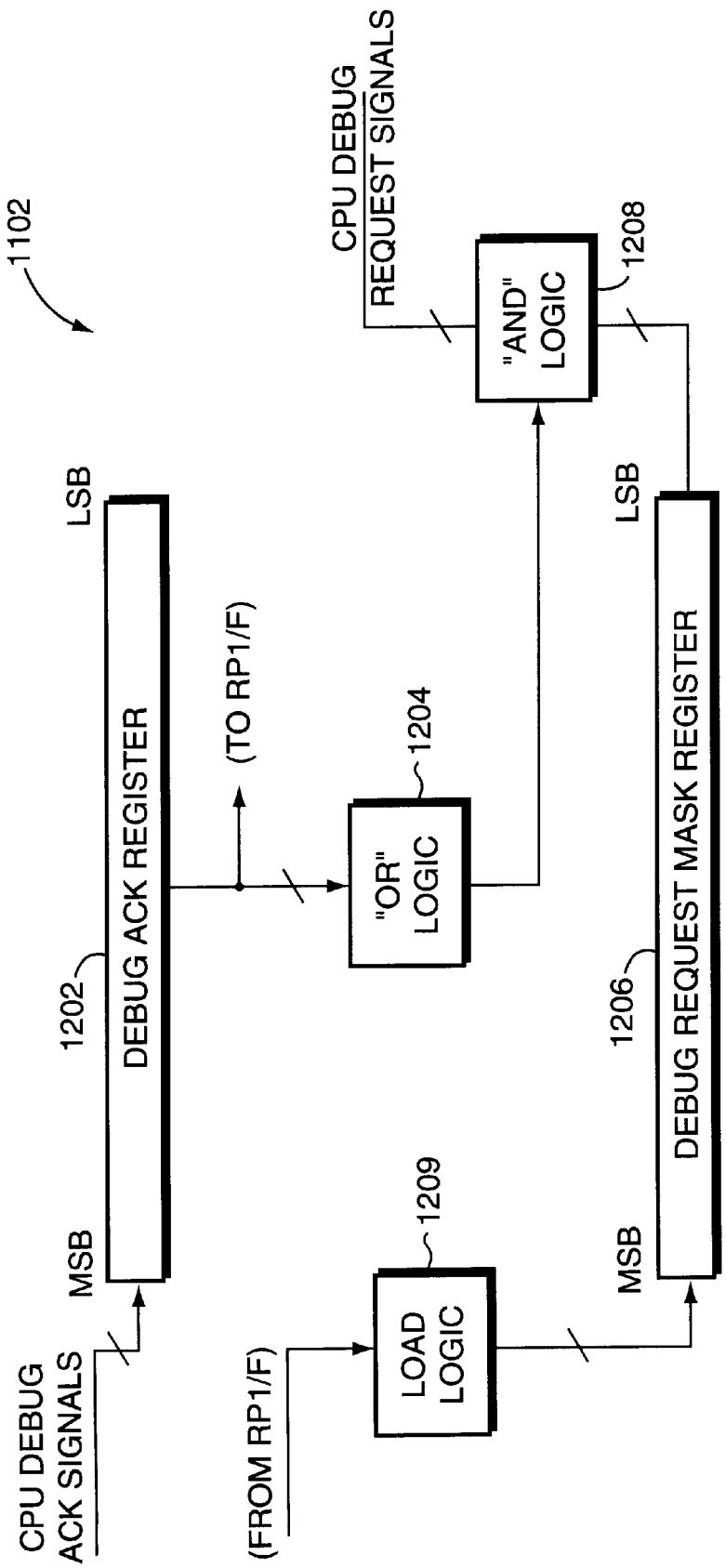
FIG. 12 is a highly schematic diagram of the debug handler logic of the processor of FIG. 11.
Figure 13:
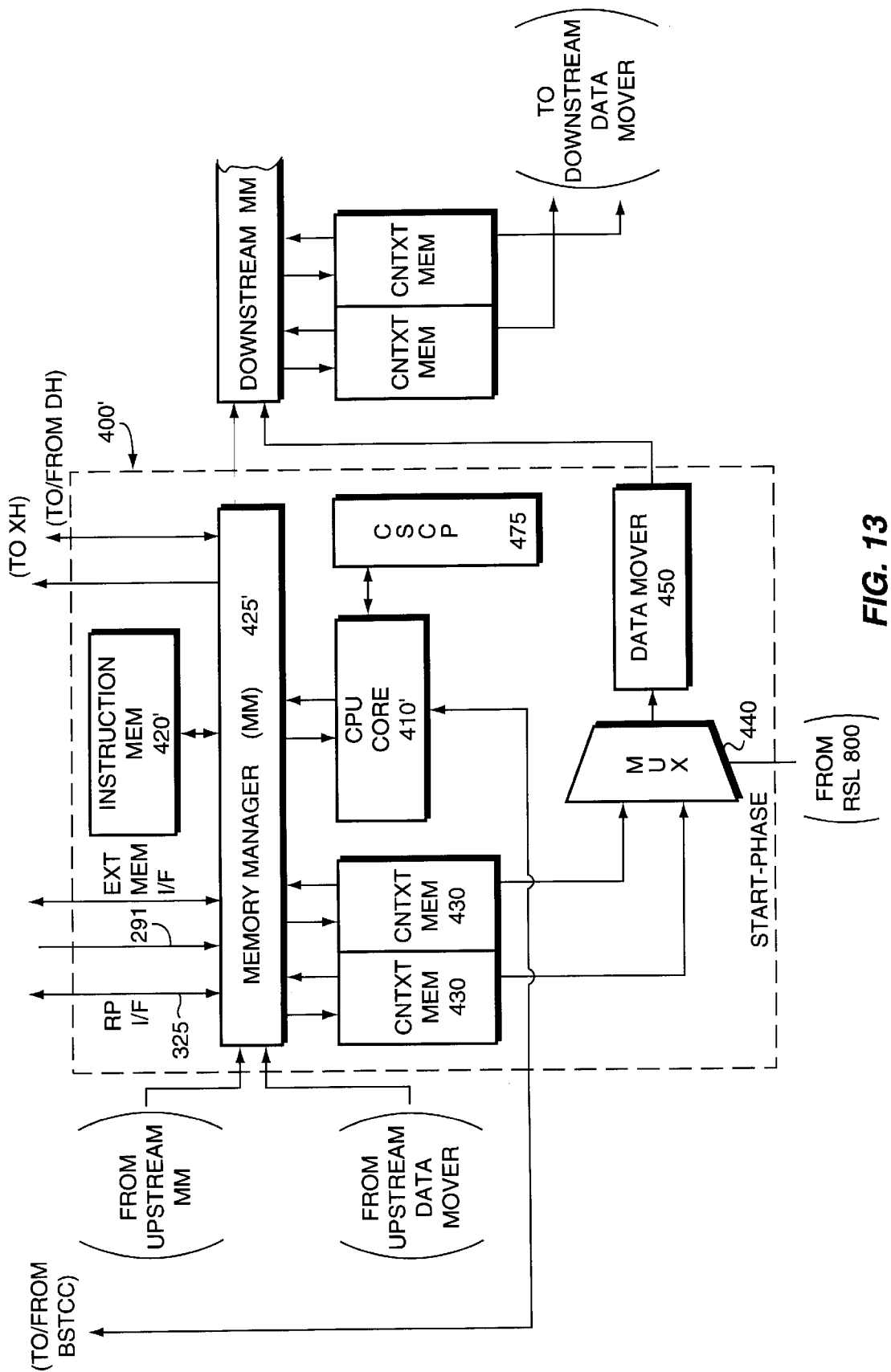
FIG. 13 is a highly schematic diagram of a processor complex element of the processor of FIG. 11.

Debug handler (DH) system 1102 is coupled to each MM 425' of each of the elements 400. As shown in FIG. 12, DH 1102 comprises a multibit debug acknowledgment register 1202 that receives the CPU debug acknowledgment signals from each of the elements 400'. More specifically, the register 1202 is configured to store a value having the same number of bits as elements 400' in processor 300', and that value is constructed by storing in respective bits whose orders (i.e., from least significant to most significant bit of the register 1202) correspond to respective unique identification numbers of the elements 400' the logic state of respective debug acknowledgment signals generated by those elements 400'. For example, the least significant bit of the register 1202 reflects the logic state (i.e., "0" or "1") of one of the elements 400' whose respective identification number is equal to "0", the next to least significant bit of the register 1202 reflects the logic state of another of the elements 400' whose respective identification number is equal to "1", and so forth, for each of the bits of the register 1202. The value contained in the register 1202 is provided to the remote processor via the circuitry 1000 of the interface 320; the remote processor uses this value to determine which, if any, of the elements 400' has entered a local debug mode. Each of the bits stored in the register 1202 is provided to OR logic 1204, the output of which logic 1204 is provided to AND logic 1208. Thus, if any of the CPU debug acknowledgment signals are in a high logic state, the output of the logic 1204 provided to the logic 1208 will be in a high logic state; alternatively, only when all of the CPU debug acknowledgment signals are in a low logic state will the output of the logic 1204 be in a low logic state.

DH 1102 also includes load logic 1209, which is controlled by the remote processor via circuitry 1000 of interface 320 to load into debug request mask register 1206 a multi-bit mask value selected by the remote processor. This multi-bit value has the same number of bits as the value stored in register 1202, and is provided to the AND logic 1208. Logic 1208 performs bitwise logic AND operations of the output of the logic 1204 with the value stored in the register 1206, and the results of these operations are output as respective CPU debug request signals to the respective elements 400'. That is, logic 1208 generates, as outputs, respective CPU debug request signals which are the results of respective logic AND operations of respective bits of the value stored in the register 1206 with the output of the logic 1204. These CPU debug request signals are provided to respective elements 400' such that the CPU debug request signal generated based upon the least significant bit of the value stored in the register 1206 is provided to the element 400' whose identification number is equal to "0", the CPU debug request signal generated based upon the next to least significant bit of that value is provided to the element 400' whose identification number is equal to "1", and so forth, for each of the CPU debug request signals.

When the MM 425' of an element 400' receives a CPU debug request signal that is in a high logic state, the MM 425' causes the element 400' to enter local debug mode of operation. When an element 400' is in local debug mode, the element enters a single step mode of operation of the type described above, in which the remote processor may advance the processing of the element 400' in single cycle increments using the register 1003, and may examine the contents of registers of the element 400' using the circuitry 1000, as previously described, in order to facilitate debugging operations of the element 400' by the remote processor. Thus, as will be readily appreciated, the remote processor is able to select which, if any, other elements 400' are also caused to enter local debug mode when an element 400' enters local debug mode, by writing an appropriate mask value in the register 1206 using logic 1209. After debugging of elements operating in local debug mode is complete, the remote processor may provide appropriate control signals to those elements to cause them to reinitialize themselves in normal operating mode.

In summary, the invention described herein advantageously provides a parallel processing engine having integrated debugging capabilities. The integrated debugging capabilities of the present invention make it easier to determine specific source(s) of improper processor operation than is possible in the prior art. Additionally, the complexity of external debug hardware and software used in debugging operations involving the processor of the present invention may be reduced compared to the prior art, since the need to provide in such hardware and software the functionality provided by the integrated debugging capabilities of the processor of the present invention may be eliminated.

The foregoing description has been directed to specific embodiments of this invention. It will be apparent, however, that other variations and modifications may be made to the described embodiments, with the attainment of some or all of their respective advantages. Therefore, it is the object of the appended claims to cover all such variations and modifications as come within the true spirit and scope of the invention.

What is claimed is:

1. A parallel processor, comprising:

a plurality of parallel processing elements, each of the elements comprising a respective central processing unit;

a fault signal generator for generating a global fault signal for being supplied to the elements to trigger all of said elements to enter a debug mode of operation, said generator generating said fault signal in response to one of a debug enable signal supplied to said processor from a source external to said processor and a global exception signal, the debug mode of operation being a single step mode of operation, the global fault signal indicating that an error condition has occurred in one of the elements, the processor also comprising an exception handling mechanism that stores an exception identification value that uniquely identifies the one of the elements in which the error condition has occurred, the value stored in the mechanism being readable by a processing system external to the processor, the mechanism also generating the global exception signal in response to another exception signal generated by the one element.

2. A parallel processor according to claim 1, further comprising, for receiving said debug enable signal, an external trigger pin.

3. A parallel processor according to claim 1, further comprising, a register and other circuitry, the register being for storing a global debug enable value for being supplied to the other circuitry, the other circuitry being configured to cause generation of the global fault signal in response to receipt of the value.

4. A parallel processor according to claim 1, further comprising a step mode run enable register, and wherein said processing elements are configured such that, when said processing elements are in said debug mode, said processing elements halt respective processing operations until a value contained in said step mode run enable register is changed, and after said value is changed, said processing elements execute only respective processing that consumes only a single clock cycle, and thereafter halt again.

5. A parallel processor according to claim 1, wherein said parallel processor further comprises a buffer for providing data from an external data source to said processing elements, said buffer being configured to enter, upon command, respective debug mode of operation, the respective debug mode being a single step mode of operation.

6. A parallel processor according to claim 1, wherein said parallel processor further comprises a buffer for receiving data from an external data source and for supplying the data to the processing elements, the buffer being configured to enter a respective debug mode of operation upon command, the respective debug mode being an operation mode wherein execution of a processing phase of the data by a next active group of processing elements is permitted, and after the phase has completed, processing of the data by the processing elements is halted.

7. A parallel processor, comprising:

a plurality of parallel processing elements, each of the elements comprising a respective central processing unit; and a debug triggering signal generator for generating a debug triggering signal for being supplied to at least one of said processing elements to cause the at least one of the processing elements to enter a local debug mode of operation, said generator generating said signal in response to at least a debug acknowledgment signal generated by another of said processing elements indicating that said another of said processing elements has entered said local debug mode, said debug mode of operation being a single step mode of operation, the generator generating the debug triggering signal based upon a debug request mask value stored in a mask register, the value specifying which of the processing elements is to enter the local debug mode when the debug acknowledge signal is generated by the another of the processing elements.

8. A parallel processor according to claim 7, wherein said another of said processing elements comprises a circuit for causing said another of said processing elements to enter said debug mode and generating said debug acknowledgment signal when a program counter of said another of said processing elements points to an instruction whose address corresponds to at least one debug breakpoint.

9. A parallel processor according to claim 8, further comprising, a breakpoint detection circuit configured to detect when a memory location whose address corresponds to a data breakpoint has been accessed by said another of said processing elements.

10. A parallel processor according to claim 7, further comprising a step mode run enable register, and wherein said processing elements are configured such that, when said processing elements are in said debug mode, said processing elements halt respective processing operations until a value contained in said [a] step mode run enable register is changed, and after said value is changed, the processing elements in the debug mode execute only respective processing that consumes only a single clock cycle, and thereafter halt again.

11. A parallel processor according to claim 7, wherein said parallel processor further comprises a buffer for providing data from an external data source to said processing elements, said buffer being configured to enter, upon command, a respective debug mode, the respective debug mode being a single step mode of operation.

12. A parallel processor according to claim 7, wherein said parallel processor further comprises a buffer for receiving data from an external data source and for supplying the data to the processing elements, the buffer being configured to enter a respective debug mode of operation upon command, the respective debug mode being an operation mode wherein execution of a processing phase of the data by a next active group of processing elements is permitted, and after the phase has completed, processing of the data by the processing elements is halted.

* * * * *